US008478781B2

(12) United States Patent
Tateno

(10) Patent No.: US 8,478,781 B2
(45) Date of Patent: Jul. 2, 2013

(54) INFORMATION PROCESSING APPARATUS, INFORMATION PROCESSING METHOD AND PROGRAM

(75) Inventor: Kei Tateno, Kanagawa (JP)

(73) Assignee: Sony Corporation, Tokyo (JP)

( * ) Notice: Subject to any disclaimer, the term of this patent is extended or adjusted under 35 U.S.C. 154(b) by 270 days.

(21) Appl. No.: 11/815,538

(22) PCT Filed: Dec. 4, 2006

(86) PCT No.: PCT/JP2006/324157
§ 371 (c)(1),
(2), (4) Date: Dec. 15, 2008

(87) PCT Pub. No.: WO2007/066607
PCT Pub. Date: Jun. 14, 2007

(65) Prior Publication Data
US 2009/0106195 A1    Apr. 23, 2009

(30) Foreign Application Priority Data

Dec. 5, 2005 (JP) ................................. 2005-350824
Nov. 21, 2006 (JP) ................................. 2006-314534

(51) Int. Cl.
*G06F 17/30* (2006.01)
*G06F 7/00* (2006.01)

(52) U.S. Cl.
USPC ........................................................ 707/780

(58) Field of Classification Search
USPC ........................................................ 707/780
See application file for complete search history.

(56) References Cited

U.S. PATENT DOCUMENTS 6,687,696 B2   2/2004  Hofmann et al.
2006/0036640 A1  2/2006  Tateno et al.

FOREIGN PATENT DOCUMENTS

JP    11-96165     4/1999
JP  2001-175676    6/2001

(Continued)

OTHER PUBLICATIONS

Turnbull, D.: "Automatic Music Annotation"[Online] May 25, 2005, pp. 1-19, Retrieved from the Internet: URL:http://cseweb.ucsd.edu/~elkan/254sprin g05/annotate.*

(Continued)

*Primary Examiner* — Kuen Lu
(74) *Attorney, Agent, or Firm* — Finnegan, Henderson, Farabow, Garrett & Dunner, LLP

(57) ABSTRACT

The present invention relates to an information processing apparatus, an information processing method and an information processing program that are capable of assigning an optimum keyword to a content. The information processing apparatus includes a content characteristic quantity extraction unit 52, a label information extraction unit 54, a associating information computation unit 56, a content characteristic quantity—latent space associating information storage unit 57 and a label information—latent space associating information storage unit 58. The content characteristic quantity extraction unit 52 extracts characteristic quantities related to a content whereas the label information extraction unit 54 extracts label information showing attributes of a content. The associating information computation unit 56 computes parameters representing the property of a probability distribution for a latent variable $Z_k$ common to the characteristic quantities and the label information, the property of a probability distribution for the characteristic quantities and the property of a probability distribution for label information. By storing computed values for the latent variable $z_k$ in the content characteristic quantity—latent space associating information storage unit 57 and the label information—latent space associating information storage unit 58, the information processing apparatus is capable of assigning an optimum keyword to a content. The present invention can be applied to the information processing apparatus.

10 Claims, 28 Drawing Sheets

FOREIGN PATENT DOCUMENTS

| | | |
|---|---|---|
| JP | 2002-41573 | 2/2002 |
| JP | 2006-48286 | 2/2006 |
| JP | 2006-48287 | 2/2006 |
| JP | 2006-48288 | 2/2006 |
| JP | 2006-48289 | 2/2006 |

OTHER PUBLICATIONS

Ahrendt Pet Al: "Co-Occurrence Models in Music Genre Classification" Machine Learning for Signal Processing, 2005 IEEE Workshop on Mystic, CT, USA Sep. 28-30, 2005.*

Pavlovic V: "Multimodal tracking and classification of audio-visual features" Proceedings of IPCIP'98 International Conference on Image Processing, vol. 1, Oct. 4, 1998.*

T. Hofmann, "Probabilistic Latent Semantic Indexing", SIGIR '99, pp. 50-57, Berkeley, California (1999).

H. Takamura, et al., "Co-clustering for Text Categorization", Information Processing Society of Japan, vol. 44, No. 2 (2003).

European Search Report for Application No. EP 06 82 3564, mailed on Mar. 5, 2010.

Turnbull, D.: "Automatic Music Annotation," [Online], May 25, 2005, pp. 1-19, retrieved from the internet: http://cseweb.ucsd.edu/~elkan/254spring05/annotateMusic.pdf.

Ahrendt, P. et al: "Co-occurrence Models in Music Genre Classification," Machine Learning for Signal Processing, 2005 IEEE Workshop on Mystic, CT, USA, Sep. 28-30, 2005, pp. 247-252.

Hoffman, T.: "Latent Semantic Models for Collaborative Filtering," ACM Trans. on Information Systems, vol. 22, No. 1, Jan. 2004, pp. 89-115.

Hoffman, T.: "Probabilistic Latent Semantic Indexing," Proc. Sigir, Aug. 1999, pp. 50-57.

Pavlovic, V.: "Multimodal Tracking and Classification of Audio-Visual Features," icip, vol. 1, pp. 343-347, 1998 International Conference on Image Processing (ICIP'98).

Notification of Reasons for Refusal, issued Mar. 27, 2012 with English language translation from the Japanese Patent Office in corresponding Japanese Patent application No. 2006-314534.

Notification of Reasons for Refusal, issued Nov. 29, 2011 with English language translation from the Japanese Patent Office in corresponding Japanese Patent application No. 2006-314534.

Daichi Mochihashi et al. "Evaluation of Probabilistic Semantic Space by PLSA", Information Processing, No. 4, Society Research Report, Japan, Incorporated Association Information Processing Society, Jan. 21, vol. 2003, vol. No. 4, 2003, pp. 41-47, 2003-NL-153.

Ryo Taguchi et al. "A Learning Mechanism of Word Meaning Based on the On-line-EM Algorithm and Application of Learning Biases", Dec. 21, 2005, vol. 2005, No. 127, pp. 19-24, 2005-SLP-59.

Takeshi Abegawa et al. "Japanese dependency parsing using co-coccurrence information and combination of case-slots",Natural language processing, Japan, Language Processing Society, Apr. 10, 2006, vol. 13, vol. No. 2, pp. 43-62, (2006).

* cited by examiner

FIG.4

|  | SPEED | BRIGHTNESS | SOUND PRESSURE |
|---|---|---|---|
| MUSICAL CONTENT 1 | 71 | 52 | 58 |
| MUSICAL CONTENT 2 | 53 | 65 | 67 |
| MUSICAL CONTENT 3 | 47 | 75 | 51 |
| MUSICAL CONTENT 4 | 59 | 55 | 48 |
| MUSICAL CONTENT 5 | 57 | 52 | 59 |
| MUSICAL CONTENT 6 | 39 | 39 | 31 |
| MUSICAL CONTENT 7 | 45 | 55 | 40 |
| MUSICAL CONTENT 8 | 34 | 34 | 34 |
| MUSICAL CONTENT 9 | 39 | 27 | 45 |
| MUSICAL CONTENT 10 | 36 | 45 | 46 |

FIG. 5

| | COMFORTABLE | CHEERFUL | CRAZY | HEAVY | LIGHT |
|---|---|---|---|---|---|
| MUSICAL CONTENT 1 | 0 | 0 | 2 | 0 | 2 |
| MUSICAL CONTENT 2 | 0 | 1 | 1 | 0 | 1 |
| MUSICAL CONTENT 3 | 0 | 2 | 2 | 0 | 0 |
| MUSICAL CONTENT 4 | 0 | 0 | 1 | 0 | 1 |
| MUSICAL CONTENT 5 | 1 | 0 | 1 | 0 | 1 |
| MUSICAL CONTENT 6 | 0 | 0 | 0 | 1 | 0 |
| MUSICAL CONTENT 7 | 1 | 0 | 1 | 0 | 0 |
| MUSICAL CONTENT 8 | 1 | 0 | 0 | 2 | 0 |
| MUSICAL CONTENT 9 | 1 | 0 | 0 | 0 | 0 |
| MUSICAL CONTENT 10 | 2 | 0 | 0 | 0 | 0 |

FIG.8

|  | z1 | z2 |
|---|---|---|
| MUSICAL CONTENT 1 | 0.9 | 0.1 |
| MUSICAL CONTENT 2 | 0.7 | 0.3 |
| MUSICAL CONTENT 3 | 0.6 | 0.4 |
| MUSICAL CONTENT 4 | 0.65 | 0.35 |
| MUSICAL CONTENT 5 | 0.6 | 0.4 |
| MUSICAL CONTENT 6 | 0.2 | 0.8 |
| MUSICAL CONTENT 7 | 0.4 | 0.6 |
| MUSICAL CONTENT 8 | 0.1 | 0.8 |
| MUSICAL CONTENT 9 | 0.3 | 0.7 |
| MUSICAL CONTENT 10 | 0.4 | 0.6 |

FIG.9

|  | z1 | z2 |
|---|---|---|
| COMFORTABLE | 0.1 | 0.9 |
| CHEERFUL | 0.7 | 0.3 |
| CRAZY | 0.7 | 0.3 |
| HEAVY | 0.2 | 0.8 |
| LIGHT | 0.9 | 0.1 |

FIG.10

|  | z1 | z2 |
|---|---|---|
| $P(z_k)$ | 0.48 | 0.52 |

FIG.11

|  | SPEED | BRIGHTNESS | SOUND PRESSURE |
|---|---|---|---|
| SPEED | 80 | -30 | 5 |
| BRIGHTNESS | -30 | 100 | -10 |
| SOUND PRESSURE | 5 | -10 | 50 |

FIG.12

|  | SPEED | BRIGHTNESS | SOUND PRESSURE |
|---|---|---|---|
| SPEED | 30 | 30 | 10 |
| BRIGHTNESS | 30 | 90 | 0 |
| SOUND PRESSURE | 10 | 0 | 50 |

|  | μ1 | μ2 |
|---|---|---|
| SPEED | 58 | 42 |
| BRIGHTNESS | 63 | 39 |
| SOUND PRESSURE | 59 | 40 |

| WORD | JS DIVERGENCE |
|---|---|
| COMFORTABLE | 0.3000 |
| CHEERFUL | 0.0119 |
| CRAZY | 0.0119 |
| HEAVY | 0.2150 |
| LIGHT | 0.0053 |

FIG.17

|  | JS DIVERGENCE |
|---|---|
| MUSICAL CONTENT 1 | 0.3100 |
| MUSICAL CONTENT 2 | 0.0051 |
| MUSICAL CONTENT 3 | 0.0022 |
| MUSICAL CONTENT 4 | 0.1114 |
| MUSICAL CONTENT 5 | 0.2547 |
| MUSICAL CONTENT 6 | 0.0947 |
| MUSICAL CONTENT 7 | 0.1473 |
| MUSICAL CONTENT 8 | 0.4123 |
| MUSICAL CONTENT 9 | 0.1119 |
| MUSICAL CONTENT 10 | 0.3451 |
| MUSICAL CONTENT 11 | 0.0049 |

FIG. 20

| | MORNING | DAYTIME | NIGHT | HOME | OUTDOORS | COMMUTING |
|---|---|---|---|---|---|---|
| MUSICAL CONTENT 1 | 3 | 4 | 2 | 2 | 3 | 4 |
| MUSICAL CONTENT 2 | 5 | 4 | 2 | 3 | 2 | 3 |
| MUSICAL CONTENT 3 | 3 | 3 | 1 | 3 | 3 | 5 |
| MUSICAL CONTENT 4 | 4 | 3 | 2 | 2 | 3 | 3 |
| MUSICAL CONTENT 5 | 4 | 2 | 3 | 2 | 2 | 4 |
| MUSICAL CONTENT 6 | 2 | 3 | 4 | 3 | 3 | 2 |
| MUSICAL CONTENT 7 | 3 | 1 | 3 | 3 | 3 | 2 |
| MUSICAL CONTENT 8 | 1 | 2 | 5 | 4 | 3 | 3 |
| MUSICAL CONTENT 9 | 2 | 2 | 4 | 5 | 2 | 2 |
| MUSICAL CONTENT 10 | 1 | 2 | 3 | 4 | 3 | 3 |

FIG.21

| CONTEXT | z1 | z2 |
|---|---|---|
| MORNING | 0.8 | 0.2 |
| DAYTIME | 0.7 | 0.3 |
| NIGHT | 0.23 | 0.77 |
| HOME | 0.3 | 0.7 |
| OUTDOORS | 0.45 | 0.55 |
| COMMUTING | 0.9 | 0.2 |

FIG. 24

| | USER 1 | USER 2 | USER 3 | USER 4 | USER 5 |
|---|---|---|---|---|---|
| MUSICAL CONTENT 1 | 3 | 4 | 2 | 2 | 4 |
| MUSICAL CONTENT 2 | 5 | 4 | 2 | 3 | 3 |
| MUSICAL CONTENT 3 | 3 | 3 | 1 | 3 | 5 |
| MUSICAL CONTENT 4 | 4 | 3 | 2 | 2 | 3 |
| MUSICAL CONTENT 5 | 4 | 2 | 3 | 2 | 4 |
| MUSICAL CONTENT 6 | 2 | 3 | 4 | 3 | 2 |
| MUSICAL CONTENT 7 | 3 | 1 | 3 | 3 | 2 |
| MUSICAL CONTENT 8 | 1 | 2 | 5 | 4 | 3 |
| MUSICAL CONTENT 9 | 2 | 2 | 4 | 5 | 2 |
| MUSICAL CONTENT 10 | 1 | 2 | 3 | 4 | 3 |

FIG.25

| USER | z1 | z2 |
|---|---|---|
| USER 1 | 0.8 | 0.2 |
| USER 2 | 0.7 | 0.3 |
| USER 3 | 0.3 | 0.7 |
| USER 4 | 0.45 | 0.55 |
| USER 5 | 0.9 | 0.2 |

FIG.26

| CONTEXT | FEATURE CHARACTERISTIC |
|---|---|
| MORNING | 0.500 |
| DAYTIME | 0.389 |
| NIGHT | 0.461 |
| HOME | 0.389 |
| OUTDOORS | 0.311 |
| COMMUTING | 0.675 |

FIG.30

... HITASURA AKARUI NORINORI NO KYOKU GA ...

⇩ ANALYSIS OF MORPHEMES

| | | | | |
|---|---|---|---|---|
| ... | | | | |
| HITASURA | HITASURA | HITASURA | ADVERB-ADJECTIVE GENERAL | |
| AKARUI | AKARUI | AKARUI | ADJECTIVE-INDEPENDENT | ADJECTIVE-VOWEL STAGE BASIC FORM |
| NORINORI | NORINORI | NORINORI | NOUN-ADJECTIVE/VERB BASE | |
| NO | NO | NO | PARTICLE-ADNOMINAL CLAUSE | |
| KYOKU | KYOKU | KYOKU | NOUN-GENERAL | |
| GA | GA | GA | PARTICLE-CASE PARTICLE-GENERAL | |
| ... | | | | |

| PHRASE | z1 | z2 |
|---|---|---|
| HITASURA | 0.4 | 0.6 |
| AKARUI | 0.8 | 0.2 |
| NORINORI | 0.7 | 0.3 |
| KYOKU | 0.5 | 0.5 |
| ⋮ | ⋮ | ⋮ |

| PHRASE | FEATURE CHARACTERISTIC |
|---|---|
| HITASURA | 0.708 |
| AKARUI | 0.859 |
| NORINORI | 0.816 |
| KYOKU | 0.699 |
| ⋮ | ⋮ |

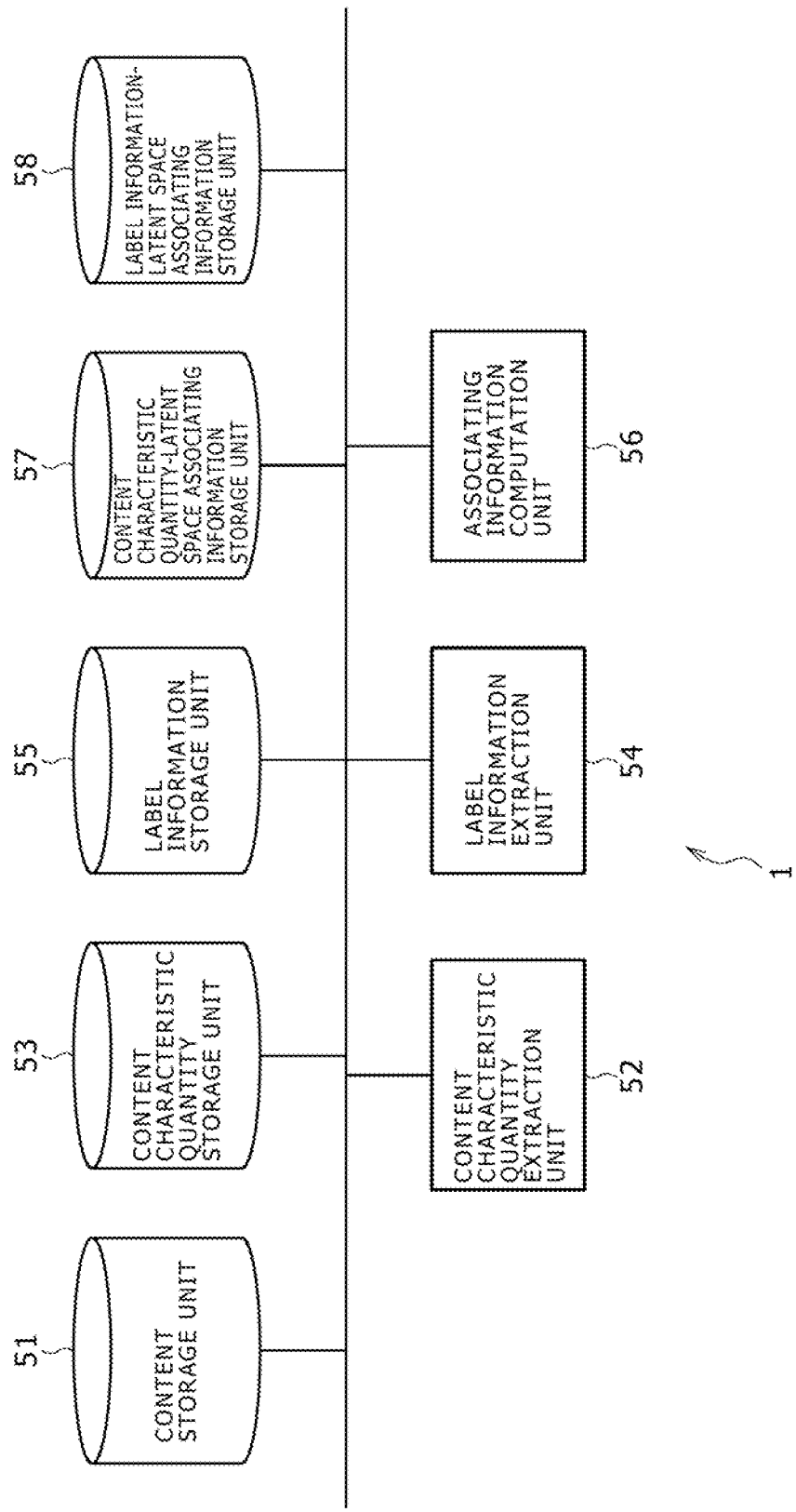

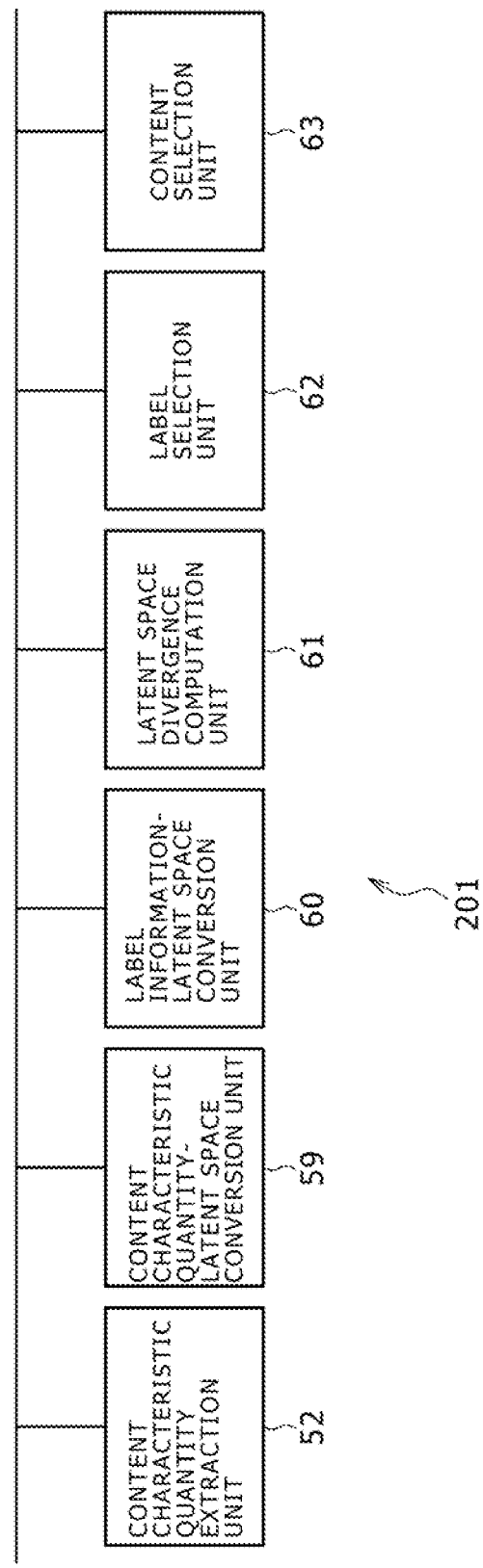

INFORMATION PROCESSING APPARATUS, INFORMATION PROCESSING METHOD AND PROGRAM

TECHNICAL FIELD

The present invention relates to an information processing apparatus, an information processing method and an information processing program. More particularly, the present invention relates to an information processing apparatus, an information processing method and an information processing program that are capable of assigning an optimum keyword to a content.

BACKGROUND ART

There is a technology introduced in the past as a technology for searching for an audio or video content and classifying audio and video contents by providing a keyword to each of the contents. Such a keyword is generally referred to as metadata. In order to assign a keyword to each content, a very large amount of manual work is required as is the case with, for example, a CDDB (CD Database) for providing information such as the names of musical contents recorded on every CD (Compact Disc) serving as a recipient and the names of artists associated with the musical contents. In this case, every time new contents are introduced, manual work is done to register a keyword for each of the contents.

In addition, there has particularly been developed a technology for expressing characteristics of each individual musical content in terms of a numerical value as a technology provided for musical contents and the like, and there is also a technology for inferring metadata such as a keyword from such numerical value.

To put it concretely, there is also an information processing apparatus (such as an apparatus described in Patent Document 1) wherein, in accordance with Quantification Type III, which is a multivariate technique, a discrete quantity such as a keyword given to an individual content is placed in a continuous-quantity space and a canonical correlation analysis is carried out in the continuous-quantity space as well as the space of characteristic quantities in order to obtain a relation associating the continuous-quantity space and the space of characteristic quantities. Then, by making use of the associating relation, a keyword is inferred from a characteristic quantity of a new content.

In addition, there have also been proposed a technique for clustering contents, a technique for clustering keywords (such as a technique described in Patent Document 2), a technique for clustering contents and keywords at the same time (such as a technique described in Non-Patent Document 1) and a technique for recommending a content matching the favorite of a user or matching a context (such as a technique described in Patent Document 3).

The references mentioned above are listed as follows.
[Patent Document 1]
Japanese Patent Laid-open No. Hei 11-96165
[Patent Document 2]
Japanese Patent Laid-open No. 2002-41573
[Patent Document 3]
Japanese Patent Laid-open No. 2001-175676
[Non-Patent Document 1]
Hiroya Takamura and Yuji Matsumoto, "Co-clustering for Text Categorization," magazine of the Information Processing Society of Japan, Vol. 44, No. 02, an issue of February 2003.

DISCLOSURE OF THE INVENTION

Problems to be Solved by the Invention

Every time an additional content is newly introduced, however, a very large amount of manual work is done to give a keyword to the content, raising a problem that a cost is incurred everlastingly.

In addition, if the conventional technique to give a keyword to a content is adopted, the process to give the keyword to the content cannot be said to be a process to provide the content with a keyword suitable for the content.

For example, the apparatus disclosed in Japanese Patent Laid-Open No. Hei 11-96165 infers a keyword by adoption of Quantification Type III. Since Quantification Type III can be applied to qualitative data only, however, this multivariate technique cannot be used for assigning a weight to for example a word that appears a number of times in a text reviewing a musical content as a weight indicating that a word appearing a number of times in such a text is regarded as an important word.

In addition, for example, the techniques disclosed in Japanese Patent Laid-open No. 2002-41573 and Non-Patent Document 1 are each a technique for clustering contents and keywords. However, these techniques cannot be used for carrying out clustering and modeling processes by using both characteristic quantities each representing the characteristic of a content and keywords each assigned to a content.

On top of that, the technique disclosed in Japanese Patent Laid-Open No. 2001-175676 is a technique for recommending a content matching a favorite with a user or matching a context. However, the technique adopts a method for recommending a content having a small divergence from a user profile created from accumulated metadata of highly appreciated contents. Thus, since distribution of information on favorites is not taken into consideration, the technique cannot be said to be a technique for recommending an optimum content.

Addressing the problems described above, the present invention makes it possible to assign an optimum keyword to a content.

Means for Solving the Problems

In accordance with a first aspect of the present invention, there is provided an information processing apparatus including:

first computation means for computing a first parameter representing the property of a probability distribution for a first latent variable common to a characteristic quantity related to a content and attribute information showing attributes of the content, the property of a probability distribution for the characteristic quantity and the property of a probability distribution for the attribute information; and storage means for storing the computed first parameter.

The information processing apparatus may have a configuration further including first extraction means for extracting the characteristic quantity and second extraction means for extracting the attribute information wherein the first computation means computes the first parameter from the extracted characteristic quantity and the extracted attribute information.

The information processing apparatus may have a configuration in which the second extraction means splits a sentence written in a natural language into words or phrases each composed of the words.

The information processing apparatus may have a configuration further including: second computation means for computing a feature characteristic showing the degree of relationship between the phrase and the characteristic quantity on the basis of the first parameter computed by the first computation means; and display control means for controlling a process to display the phrase on the basis of the extracted feature characteristic.

The information processing apparatus may have a configuration in which: the first computation means computes a second parameter representing the property of a probability distribution for the characteristic quantity, the property of a probability distribution for the attribute information and the property of a probability distribution for a second latent variable common to the characteristic quantity, the attribute information, and utilization information used as information on utilization of the content by a user; and the storage means is used for storing the second parameter computed by the first computation means.

The information processing apparatus may have a configuration further including extraction means for extracting the utilization information wherein the first computation means computes the second parameter from the characteristic quantity, the attribute information or the extracted utilization information.

The information processing apparatus may have a configuration in which: the first computation means computes a third parameter representing the property of a probability distribution for the characteristic quantity, the property of a probability distribution for the attribute information and the property of a probability distribution for a third latent variable common to the characteristic quantity, the attribute information and favorite information used as information on contents each serving as a favorite with a user; and the storage means is used for storing the computed third parameter.

The information processing apparatus may have a configuration further including extraction means for extracting the favorite information, wherein the first computation means computes the third parameter from the characteristic quantity, the attribute information or the extracted favorite information.

In accordance with the first aspect of the present invention, there is provided an information processing method including: a computation step of computing parameters representing the property of a probability distribution for a latent variable common to a characteristic quantity related to a content and attribute information showing attributes of the content, the property of a probability distribution for the characteristic quantity and the property of a probability distribution for the attribute information; and a storing step of storing the computed parameter.

In accordance with the first aspect of the present invention, there is provided a program to be executed by a computer to carry out: a computation step of computing parameters representing the property of a probability distribution for a latent variable common to a characteristic quantity related to a content and attribute information showing attributes of the content, the property of a probability distribution for the characteristic quantity and the property of a probability distribution for the attribute information; and a storing step of storing the computed parameter.

In accordance with the first aspect of the present invention, a first parameter is computed as parameters representing the property of a probability distribution for a first latent variable common to a characteristic quantity related to a content and attribute information showing attributes of the content, the property of a probability distribution for the characteristic quantity and the property of a probability distribution for the attribute information; and the computed first parameter is stored.

In accordance with a second aspect of the present invention, there is provided an information processing apparatus including: extraction means for extracting a characteristic quantity related to a content; conversion means for carrying out a conversion process to place the extracted characteristic quantity in a latent space on the basis of parameters representing the property of a probability distribution for a latent variable common to the characteristic quantity and attribute information showing attributes of the content, the property of a probability distribution for the characteristic quantity and the property of a probability distribution for the attribute information; computation means for computing a divergence between the characteristic quantity placed in the latent space as a result of the conversion process and the attribute information latently associated with the characteristic quantity by the latent variable; and selection means for selecting an attribute for the content on the basis of the computed divergence.

The information processing apparatus may have a configuration in which, as the selected attribute for the content, the selection means selects an attribute for which the computed divergence is not greater than a threshold value, or selects a predetermined number of attributes having smallest divergences among all attributes.

In accordance with the second aspect of the present invention, there is provided an information processing method including: an extraction step of extracting a characteristic quantity related to a content; a conversion step of carrying out a conversion process to place the extracted characteristic quantity in a latent space on the basis of parameters representing the property of a probability distribution for a latent variable common to the characteristic quantity and attribute information showing attributes of the content, the property of a probability distribution for the characteristic quantity and the property of a probability distribution for the attribute information; a computation step of computing a divergence between the characteristic quantity placed in the latent space as a result of the conversion process and the attribute information latently associated with the characteristic quantity by the latent variable; and a selection step of selecting an attribute for the content on the basis of the divergence computed at the computation step.

In accordance with the second aspect of the present invention, there is provided a program to be executed by a computer to carry out: an extraction step of extracting a characteristic quantity related to a content; a conversion step of carrying out a conversion process to place the extracted characteristic quantity in a latent space on the basis of parameters representing the property of a probability distribution for a latent variable common to the characteristic quantity and attribute information showing attributes of the content, the property of a probability distribution for the characteristic quantity and the property of a probability distribution for the attribute information; a computation step of computing a divergence between the characteristic quantity placed in the latent space as a result of the conversion process and the attribute information latently associated with the characteristic quantity by the latent variable; and a selection step of selecting an attribute for the content on the basis of the computed divergence.

In accordance with the second aspect of the present invention: a characteristic quantity related to a content is extracted; a conversion process is carried out in order to place the extracted characteristic quantity in a latent space on the basis of parameters representing the property of a probability distribution for a latent variable common to the characteristic quantity and attribute information showing attributes of the content, the property of a probability distribution for the characteristic quantity and the property of a probability distribution for the attribute information; a divergence is computed as a divergence between the characteristic quantity placed in the latent space as a result of the conversion process and the attribute information latently associated with the characteristic quantity by the latent variable; and an attribute for the content is selected on the basis of the computed divergence.

In accordance with a third aspect of the present invention, there is provided an information processing apparatus including: conversion means for carrying out a conversion process, on the basis of parameters representing the property of a probability distribution for a latent variable common to the characteristic quantity related to a content and attribute information showing attributes of the content, the property of a probability distribution for the characteristic quantity and the property of a probability distribution for the attribute information, to place the attribute information in a latent space; computation means for computing a divergence between the characteristic quantity placed in the latent space as a result of the conversion process and the attribute information latently associated with the attribute information by the latent variable; and selection means for selecting a content for the attribute information on the basis of the computed divergence.

The information processing apparatus may have a configuration in which, as the selected content for the attribute, the selection means selects a content for which the computed divergence is not greater than a threshold value, or selects a predetermined number of contents having smallest divergences among all contents.

In accordance with the third aspect of the present invention, there is provided an information processing method including: a conversion step of carrying out a conversion process, on the basis of parameters representing the property of a probability distribution for a latent variable common to the characteristic quantity related to a content and attribute information showing attributes of the content, the property of a probability distribution for the characteristic quantity and the property of a probability distribution for the attribute information, to place the attribute information in a latent space; a computation step of computing a divergence between the attribute information placed in the latent space as a result of the conversion process and the characteristic quantity latently associated with the attribute information by the latent variable; and a selection step of selecting a content for the attribute information on the basis of the computed divergence.

In accordance with the third aspect of the present invention, there is provided a program to be executed by a computer to carry out: a conversion step of carrying out a conversion process, on the basis of parameters representing the property of a probability distribution for a latent variable common to a characteristic quantity and attribute information showing attributes of the content, the property of a probability distribution for the characteristic quantity and the property of a probability distribution for the attribute information, to place the attribute information in a latent space; a computation step of computing a divergence between the attribute information placed in the latent space as a result of the conversion process and the characteristic quantity latently associated with the attribute information by the latent variable; and a selection step of selecting a content for the attribute information on the basis of the computed divergence.

In accordance with the third aspect of the present invention: a conversion process is carried out in order to place an attribute information in a latent space on the basis of parameters representing the property of a probability distribution for a latent variable common to a characteristic quantity related to a content and the attribute information showing attributes of the content, the property of a probability distribution for the characteristic quantity and the property of a probability distribution for the attribute information; a divergence is computed as a divergence between the attribute information placed in the latent space as a result of the conversion process and the characteristic quantity latently associated with the attribute information by the latent variable; and a content for the content is selected on the basis of the computed divergence.

Effects of the Invention

As described above, in accordance with the first aspect of the present invention, an optimum keyword can be assigned to each content.

In addition, in accordance with the second aspect of the present invention, an optimum keyword can be assigned to each content.

On top of that, in accordance with the third aspect of the present invention, it is possible to search for a content corresponding to a keyword with a higher degree of reliability.

BRIEF DESCRIPTION OF THE DRAWINGS

FIG. 4 is a diagram showing typical characteristic quantities of musical contents.

FIG. 5 is a diagram showing typical label information of musical contents.

FIG. 8 is a diagram showing an expression based on a latent space as a typical expression for contents.

FIG. 9 is a diagram showing an expression based on a latent space as a typical expression for label information.

FIG. 10 is a diagram showing typical pre-probabilities of latent variables $z_k$.

FIG. 11 is a diagram showing a typical variance—covariance matrix $S_1$ for a latent variable $z1$.

FIG. 12 is a diagram showing a typical variance—covariance matrix $S_2$ for a latent variable $z2$.

FIG. 17 is a diagram showing typical divergences computed by a latent-space divergence computation unit as typical divergences between contents and a label.

FIG. 20 is a diagram showing typical context information for musical contents.

FIG. 21 is a diagram showing an expression based on a latent space as a typical expression for context information.

FIG. 24 is a diagram showing typical favorite information for musical contents serving as favorites with users.

FIG. 25 is a diagram showing an expression based on a latent space as a typical expression for favorite information.

FIG. 26 is a diagram showing a typical feature characteristic of a context.

FIG. 30 is a diagram showing a typical analysis of morphemes.

FIG. 36 is a functional block diagram showing a typical functional configuration of a content providing apparatus for carrying out processing at a learning phase.

FIG. 37 is a functional block diagram showing a typical functional configuration of a client terminal apparatus for carrying out processing at an operation phase.

DESCRIPTION OF REFERENCE NUMERALS

Figure 1:
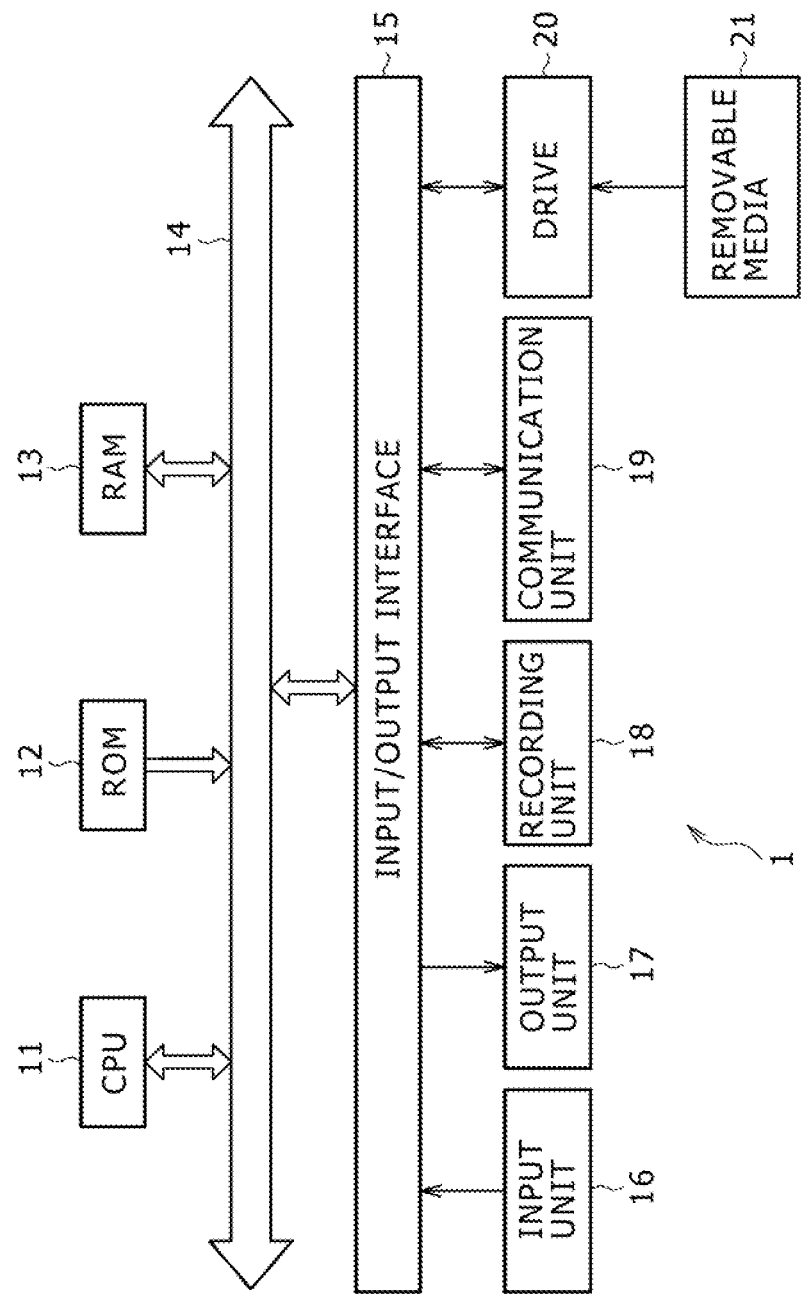
FIG. 1 is an explanatory block diagram showing a typical configuration of hardware employed in a content providing apparatus.

1: Content providing apparatus
11: CPU
12: ROM
13: RAM
16: Input unit
17: Output unit
18: Recording unit
19: Communication unit
20: Drive
21: Removable media
51: Content storage unit
52: Content characteristic quantity extraction unit
53: Content characteristic quantity storage unit
54: Label information extraction unit
55: Label information storage unit
56: Associating information computation unit
57: Content characteristic quantity—latent space associating information storage unit
58: Label information—latent space associating information storage unit
59: Content characteristic quantity—latent space conversion unit
60: Label information—latent space conversion unit
61: Latent space divergence computation unit
62: Label selection unit
63: Content selection unit
111: Context information extraction unit
112: Context information storage unit
113: Context information—latent space associating information storage unit
151: Favorite information extraction unit
152: Favorite information storage unit
153: Favorite information—latent space associating information storage unit
171: Text storage unit
181: Feature-characteristic computation unit
182: Characteristic-phrase selection unit
183: Phrase display control unit
184: Display unit
201: Client terminal apparatus

BEST MODES FOR CARRYING OUT THE INVENTION

Embodiments of the present invention are explained by referring to diagrams as follows.

FIG. 1 is an explanatory block diagram showing a typical configuration of hardware employed in a content providing apparatus.

In the content providing apparatus 1 shown in FIG. 1, a CPU (Central Processing Unit) 11 carries out various kinds of processing by execution of programs each stored in a ROM (Read Only Memory) 12 or programs each loaded from a recording unit 18 into a RAM (Random Access Memory) 13. The RAM 13 is also used for properly storing various kinds of information such as data required by the CPU 11 in the execution of the processing.

The CPU 11, the ROM 12 and the RAM 13 are connected to each other by a bus 14. The bus 14 is also connected to an input/output interface 15.

The input/output interface 15 is also connected to an input unit 16, an output unit 17, the recording unit 18 cited above and a communication unit 19. The input unit 16 includes a keyboard and a mouse whereas the output unit 17 includes a display unit such as an LCD (Liquid Crystal Display) unit and a speaker. The recording unit 18 has a configuration typically including a hard disk. The communication section 19 is a unit for controlling processing of communications with other apparatus through a network such as the Internet.

If necessary, the input/output interface 15 is also connected to a drive 20 on which removable recording media 21 is mounted. The removable recording media 21 can be a magnetic disk, an optical disk, a magneto-optical disk or a semiconductor memory. When the removable recording media 21 is mounted on the drive 20, if necessary, the drive 20 reads out a computer program from the removable recording medium 21 and installs the program into the recording unit 18.

It is to be noted that the configuration of hardware employed in the content providing apparatus 1 is by no means limited to that shown in FIG. 1. That is to say, the content providing apparatus 1 can be provided with any hardware configuration as long as the hardware includes at least a functional configuration like one to be described later by referring to FIG. 2.

Figure 2:
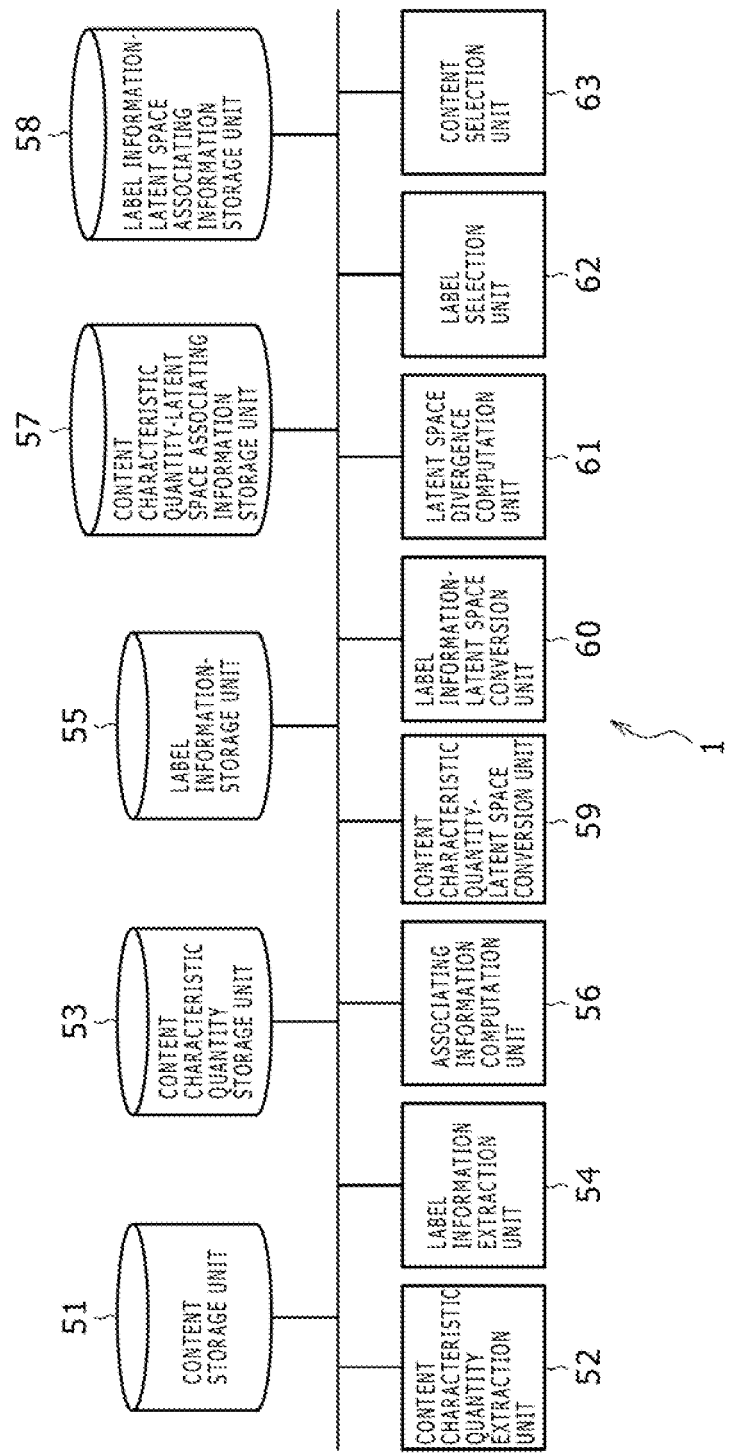
FIG. 2 is a functional block diagram showing a typical functional configuration of the content providing apparatus.

FIG. 2 is a functional block diagram showing a typical functional configuration of the content providing apparatus 1.

The content providing apparatus 1 is an apparatus for carrying out predetermined processing such as a process to extract a characteristic quantity typically from a recorded content and a process to associate the extracted characteristic quantity (or a content characteristic quantity to be described later) with a keyword (or label information to be described later). The content providing apparatus 1 is a typical information processing apparatus provided by the present invention.

The content providing apparatus 1 includes a content storage unit 51, a content characteristic quantity extraction unit 52, a content characteristic quantity storage unit 53, a label information extraction unit 54, a label information storage unit 55, an associating information computation unit 56, a content characteristic quantity—latent space associating information storage unit 57, a label information—latent space associating information storage unit 58, a content characteristic quantity—latent space conversion unit 59, a label information—latent space conversion unit 60, a latent space divergence computation unit 61, a label selection unit 62 and a content selection unit 63.

The content characteristic quantity extraction unit extracts a content characteristic quantity from a content stored (or saved) in the content storage unit 51. The content characteristic quantity extraction unit 52 stores (saves) the extracted content characteristic quantity in the content characteristic quantity storage unit 53.

In this case, the stored content is generally referred to simply as a content. Examples of a content are various kinds of information, books, sentences and a database. The information used as a content includes a television program, a movie, a photograph and a musical composition (a moving picture, a still picture, a sound or a combination of them). It is to be noted that, in the embodiment described below, a musical content, which is a piece of music used as a content, is taken as a typical content.

A content characteristic quantity is a numerical value expressing a characteristic of a content. In the case of a musical content, for example, characteristics each expressed by a numerical value as a characteristic of a piece of music include the speed (tempo), brightness and sound pressure of the piece of music. For example, the brightness of a musical content is used for indicating that a piece of major-code music is a piece of bright music while a piece of minor-code music is a piece of dark music. The sound pressure is a pressure, which is applied when a sound exists in comparison with a state in which no sound exists.

The label information extraction unit 54 extracts label information regarding a content stored (or saved) in the content storage unit 51. The label information extraction unit 54 stores (saves) the extracted label information in the label information storage unit 55.

The label information regarding a content is information showing attributes of the content. To be more specific, the label information regarding a content is information showing attributes peculiar to the content. The label information regarding a content can be used for identifying a word, symbol or tag included for example in sentences reviewing the content, lyrics to the content, a content title or a ticker of a moving picture serving as the content. The label information regarding a content can also be used for assigning a quantity such as a weight to the content.

The associating information computation unit 56 computes information associating content characteristic quantities stored in the content characteristic quantity storage unit 53 with label information stored in the label information storage unit 55. The associating information computation unit 56 stores the computed associating information for the content characteristic quantities in the content characteristic quantity—latent space associating information storage unit 57 and the computed associating information for the label information in the label information—latent space associating information storage unit 58.

As will be described later in detail, the associating information is defined as information for associating a content with label information. The associating information associates a content with label information by making use of latent variables $z_k$ to be described later.

On the basis of the associating information stored in the content characteristic quantity—latent space associating information storage unit 57, the content characteristic quantity—latent space conversion unit 59 carries out a conversion process to place an extracted content characteristic quantity in a latent space. The content characteristic quantity—latent space conversion unit 59 supplies a result of the conversion process to the latent space divergence computation unit 61.

On the basis of the associating information stored in the label information—latent space associating information storage unit 58 and the conversion-process result received from the content characteristic quantity—latent space conversion unit 59 as a result of the conversion process carried out by the content characteristic quantity—latent space conversion unit 59 to place the extracted content characteristic quantity in the latent space, the latent space divergence computation unit 61 computes a divergence between a content and each label. The latent space divergence computation unit 61 supplies the computed divergences to the label selection unit 62.

The label selection unit 62 selects a label on the basis of the computed divergences received from the latent space divergence computation unit 61.

On the basis of associating information stored in the label information—latent space associating information storage unit 58, the label information—latent space conversion unit 60 carries out a conversion process to place the processed label in the latent space. The label information—latent space conversion unit 60 supplies a result of the conversion process to the latent space divergence computation unit 61.

On the basis of associating information stored in the content characteristic quantity—latent space associating information storage unit 57 and the conversion-process result received from the label information—latent space conversion unit 60 as a result of the conversion process carried out by the label information—latent space conversion unit 60 to place the processed label in the latent space, the latent space divergence computation unit 61 computes a divergence between each content and a label. The latent space divergence computation unit 61 supplies the computed divergences to the content selection unit 63.

The content selection unit 63 selects a content on the basis of the computed divergences received from the latent space divergence computation unit 61.

In the embodiment described above, the content characteristic quantity—latent space associating information storage unit 57 and the label information—latent space associating information storage unit 58 are separated from each other. It is to be noted, however, that the two units can also be integrated into a single unit. In this case, the single unit obtained as a result of integrating the content characteristic quantity—latent space associating information storage unit 57 and the label information—latent space associating information storage unit 58 is used for storing both the associating information for content characteristic quantities and the associating information for label information.

By the way, processing carried out by the content providing apparatus 1 can be classified into two large categories. The first category is a learning process for associating content characteristic quantities with label information. In the following description, the learning process is also referred to as a learning phase. The second category is an operation process for carrying out actual operations. In the following description, the operation process is also referred to as an operation phase. In a typical operation process, a label is attached to another content by making use of a relation between content characteristic quantities and label information, which are associated with each other at the learning phase. In another typical operation process, a content is searched for. In this specification, first of all, the learning phase is explained by referring to FIGS. 3 to 13. Then, the operation phase is described by referring to FIGS. 14 to 16.

To begin with, a learning process carried out by the content providing apparatus 1 shown in FIG. 2 is explained by referring to a flowchart shown in FIG. 3 as follows.

At a step S11, the content characteristic quantity extraction unit 52 extracts content characteristic quantities from contents and stores (or saves) the extracted content characteristic quantities in the content characteristic quantity storage unit 53. For example, at the step S11, the content characteristic quantity extraction unit 52 extracts content characteristic quantities such as the speed, brightness and sound pressure of each musical content from the content stored in the content storage unit 51 and stores the extracted content characteristic quantities in the content characteristic quantity storage unit 53.

To put it concretely, let us assume for example that contents 1 to 10 have each been stored in the content storage unit 51 as a musical content. In this case, the content characteristic quantity extraction unit 52 extracts content characteristic quantities like ones shown in FIG. 4.

FIG. 4 is a diagram showing typical characteristic quantities of musical contents.

In a typical table shown in FIG. 4, the first column and the first row each show items. The items shown on the first column are each the name of a musical content stored in the content storage unit 51. On the other hand, the items shown on the first row are each the name of a content characteristic quantity for the musical contents shown on the first column. In this case, the content characteristic quantities for each of the musical contents are typically the speed, brightness and sound pressure for the musical content.

An item shown on the first row as the second item from the left is a content characteristic quantity referred to as the speed of a musical content. The speed is a numerical value expressing the extracted content characteristic quantity. Typically, the numerical value of the speed indicates that, the closer the numerical value to 0, the lower the speed of the musical content (or the slower the tempo of the musical content) but, the closer the numerical value to 100, the higher the speed of the musical content (or the faster the tempo of the musical content).

By the same token, an item shown on the first row as the third item from the left is a content characteristic quantity referred to as the brightness of a musical content. Typically, the numerical value of the brightness indicates that that, the closer the numerical value to 0, the darker the feeling for the musical content (or the closer the musical content to a minor code) but, the closer the numerical value to 100, the brighter the feeling for the musical content (or the closer the musical content to a major code). In the same way, an item shown on the first row as the fourth item from the left is a content characteristic quantity referred to as the sound pressure of a musical content. Typically, the numerical value of the sound pressure indicates that, the closer the numerical value to 0, the lower the sound pressure but, the closer the numerical value to 100, the higher the sound pressure.

That is to say, as shown in FIG. 4, the content characteristic quantity extraction unit 52 extracts a typical speed numerical value of 71, a typical brightness numerical value of 52 and a typical sound-pressure numerical value of 58 as content characteristic quantities from content 1 shown on the second row. By the same token, the content characteristic quantity extraction unit 52 extracts a typical speed numerical value of 53, a typical brightness numerical value of 65 and a typical sound-pressure numerical value of 67 as content characteristic quantities from content 2 shown on the third row. In the same way, the content characteristic quantity extraction unit 52 extracts a typical speed numerical value of 47, a typical brightness numerical value of 75 and a typical sound-pressure numerical value of 51 as content characteristic quantities from content 3 shown on the fourth row. Likewise, the content characteristic quantity extraction unit 52 extracts a typical speed numerical value of 59, a typical brightness numerical value of 55 and a typical sound-pressure numerical value of 48 as content characteristic quantities from content 4 shown on the fifth row.

Similarly, the content characteristic quantity extraction unit 52 extracts a typical speed numerical value of 57, a typical brightness numerical value of 52 and a typical sound-pressure numerical value of 59 as content characteristic quantities from content 5 shown on the sixth row. By the same token, the content characteristic quantity extraction unit 52 extracts a typical speed numerical value of 39, a typical brightness numerical value of 39 and a typical sound-pressure numerical value of 31 as content characteristic quantities from content 6 shown on the seventh row. In the same way, the content characteristic quantity extraction unit 52 extracts a typical speed numerical value of 45, a typical brightness numerical value of 55 and a typical sound-pressure numerical value of 40 as content characteristic quantities from content 7 shown on the eighth row.

Likewise, the content characteristic quantity extraction unit 52 extracts a typical speed numerical value of 34, a typical brightness numerical value of 34 and a typical sound-pressure numerical value of 34 as content characteristic quantities from content 8 shown on the ninth row. Similarly, the content characteristic quantity extraction unit 52 extracts a typical speed numerical value of 39, a typical brightness numerical value of 27 and a typical sound-pressure numerical value of 45 as content characteristic quantities from content 9 shown on the tenth row. By the same token, the content characteristic quantity extraction unit 52 extracts a typical speed numerical value of 36, a typical brightness numerical value of 45 and a typical sound-pressure numerical value of 46 as content characteristic quantities from content 10 shown on the eleventh row.

Then, the content characteristic quantity extraction unit 52 stores each of the content characteristic quantities shown in FIG. 4 as the content characteristic quantities extracted from contents 1 to 10 in the content characteristic quantity storage unit 53.

In other words, the content characteristic quantity extraction unit 52 can be said to extract content characteristic quantities from each musical content stored in the content storage unit 51 as a content having label information attached thereto and store the extracted content characteristic quantities in the content characteristic quantity storage unit 53 as a vector for the musical content.

In the embodiment described above, typical content characteristic quantities extracted from a musical content are the speed, brightness and sound pressure of the content. It is to be noted, however, that implementations of the present invention are by no means limited to the embodiment. For example, a content characteristic quantity extracted from a processed musical content can also be another characteristic quantity related to the musical content. Examples of the other characteristic quantity related to a musical content are the code, code progress and sound-source type of the musical content.

Figure 3:
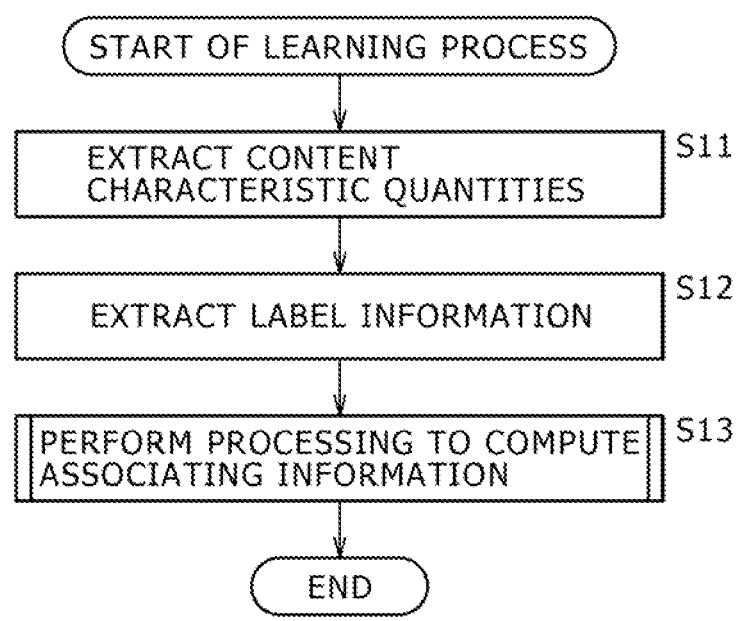
FIG. 3 shows a flowchart to be referred to in explanation of a learning process carried out by the content providing apparatus shown in FIG. 2.

Let us refer back to the flowchart shown in FIG. 3. At a step S12, the label information extraction unit 54 extracts label information and stores (or saves) the extracted label information in the label information storage unit 55. For example, at the step S12, the label information extraction unit 54 extracts label information from a text reviewing a content stored in the content storage unit 51 and stores the extracted label information in the label information storage unit 55. An example of the extracted label information related to a word as label information for a musical content is the number of times the word is used in a text reviewing the content.

To put it concretely, let us assume for example that contents 1 to 10 have been stored in the content storage unit 51. In this case, for a text reviewing each of contents 1 to 10, the label information extraction unit 54 carries out a morpheme analysis to split each text reviewing a content into words and extracts label information like one shown in FIG. 5. As shown in the figure, the label information is the number of times a word resulting from the morpheme analysis is used in the texts reviewing contents 1 to 10.

FIG. 5 is a diagram showing typical label information of musical contents.

In a typical table shown in FIG. 5, the first column and the first row each show items. The items shown on the first column are each the name of a musical content stored in the content storage unit 51. On the other hand, the items shown on the first row are each the name of label information regarding the musical contents shown on the first column. In the typical table, the names of label information are the words "comfortable", "cheerful", "crazy", "heavy" and "light", which are used in each text reviewing a musical content.

An item shown on the first row as the second item from the left is the word "comfortable" used as label information regarding each of the musical contents. The word "comfortable" used as label information regarding each of the musical contents represents the number of times the word "comfortable" appears in each text reviewing one of the musical contents. By the same token, an item shown on the first row as the third item from the left is the word "cheerful" used as label information regarding each of the musical contents. The word "cheerful" used as label information regarding each of the musical contents represents the number of times the word "cheerful" appears in each text reviewing one of the musical contents. In the same way, the remaining items shown on the first row as the fourth, fifth and sixth item from the left are respectively the words "crazy", "heavy" and "light", which are used as label information regarding each of the musical contents. The words "crazy", "heavy" and "light", which are used as label information regarding each of the musical contents, each represent the number of times the words "crazy", "heavy" or "light" respectively appear in each text reviewing one of the musical contents.

That is to say, the label information extraction unit 54 extracts label information from the text reviewing content 1 shown on the second row as information indicating that the number of times the word "crazy" is used in the text is typically 2 and the number of times the word "light" is used in the text is typically 2 as shown in FIG. 5. By the same token, the label information extracted by the label information extraction unit 54 from the text reviewing content 2 shown on the third row indicates that the number of times the word "cheerful" is used in the text is typically 1, the number of times the word "crazy" is used in the text is typically 1 and the number of times the word "light" is used in the text is typically 1 as shown in the figure. In the same way, the label information extracted by the label information extraction unit 54 from the text reviewing content 3 shown on the fourth row indicates that the number of times the word "cheerful" is used in the text is typically 2 and the number of times the word "crazy" is used in the text is typically 2 as shown in the figure. Likewise, the label information extracted by the label information extraction unit 54 from the text reviewing content 4 shown on the fifth row indicates that the number of times the word "crazy" is used in the text is typically 1 and the number of times the word "light" is used in the text is typically 1 as shown in the figure.

Similarly, the label information extracted by the label information extraction unit 54 from the text reviewing content 5 shown on the sixth row indicates that the number of times the word "crazy" is used in the text is typically 1 and the number of times the word "light" is used in the text is typically 1 as shown in the figure. By the same token, the label information extracted by the label information extraction unit 54 from the text reviewing content 6 shown on the seventh row indicates that the number of times the word "comfortable" is used in the text is typically 1 and the number of times the word "heavy" is used in the text is typically 1 as shown in the figure. In the same way, the label information extracted by the label information extraction unit 54 from the text reviewing content 7 shown on the eighth row indicates that the number of times the word "crazy" is used in the text is typically 1 as shown in the figure.

Likewise, the label information extracted by the label information extraction unit 54 from the text reviewing content 8 shown on the ninth row indicates that the number of times the word "comfortable" is used in the text is typically 1 and the number of times the word "heavy" is used in the text is typically 2 as shown in the figure. Similarly, the label information extracted by the label information extraction unit 54 from the text reviewing content 9 shown on the tenth row indicates that the number of times the word "comfortable" is used in the text is typically 1 as shown in the figure. By the same token, the label information extracted by the label information extraction unit 54 from the text reviewing content 10 shown on the eleventh row indicates that the number of times the word "comfortable" is used in the text is typically 2 as shown in the figure.

The label information extraction unit 54 stores each piece of information shown in FIG. 5 as label information extracted from contents 1 to 10 in the label information storage unit 55.

In the embodiment described above, the words "comfortable", "cheerful", "crazy", "heavy" and "light" are each taken as an example of the label information. It is to be noted, however, that implementations of the present invention are by no means limited to the embodiment. For example, the words "fast", "relaxed" and "slow" can also be taken as label information. That is to say, any word can also be taken as label information for a musical content as long as the word is used in a text reviewing the content.

Let us refer back to the flowchart shown in FIG. 3. At a step S13, the associating information computation unit 56 carries out processing to find associating information for content characteristic quantities and associating information for label information. The associating information computation unit 56 then stores associating information for content characteristic quantities and associating information for label information in the content characteristic quantity—latent space associating information storage unit 57 and the label information—latent space associating information storage unit 58 respectively as results of the processing. Then, the learning process is finally ended.

Details of the processing carried out by the associating information computation unit 56 at the step S13 to find information associating content characteristic quantities with label information are explained by referring to a flowchart shown in FIG. 6 as follows.

At a step S21, the associating information computation unit 56 computes information associating content characteristic quantities stored in the content characteristic quantity storage unit 53 with label information stored in the label information storage unit 55.

Details of the information associating content characteristic quantities with label information are explained as follows. In general, the distribution of the content characteristic quantity is different from the distribution of the label information to be associated by the associating information with the content characteristic quantity. It is thus necessary to join the distribution of the content characteristic quantity to the distribution of the label information. In particular, a continuous quantity and discrete quantities cannot be handled in the same space. Thus, there is a problem as to how to join two spaces having different distributions to each other. If the case of a continuous content characteristic quantity, for example, techniques such as a main-component analysis, a factor analysis and a mixed normal distribution (GMM (Gaussian Mixture Model)) have been used in the past for modeling the distribution of the content characteristic quantity.

In the mixed normal distribution (GMM), the appearance of an observed point is regarded as appearance from a plurality of latent normal distributions. In this embodiment, the observed point is an individual musical content expressed in terms of content characteristic quantities. In general, its latent distribution parameter is inferred on the basis of likelihood. An EM (Expectation Maximization) algorithm is a typical representative one of methods to infer a latent distribution parameter on the basis of likelihood. Other methods to infer a latent distribution parameter on the basis of likelihood include a variation Bayes method making use of the concept of Bayes inference.

On the other hand, the modeling of the latent information of a musical content typically includes a PLSA (Probabilistic Latent Semantic Analysis). As described above, the latent information of a musical content includes the number of times a word is used in a text reviewing the musical content. In the PLSA, as a conditional probability of a latent variable, the co-occurrence of a text and a word is expressed in order to infer their conditional probabilities also on the basis of likelihood.

What is common to these algorithms is the fact that, in each of the algorithms, a distribution parameter is determined by making use of a latent variable. Thus, by making latent variables a common variable, it is possible to obtain a latent conceptual space in a form reflecting the characteristics of the distributions. In this case, the latent variables made a common variable are a latent variable for expressing the distribution of the content characteristic quantity and a latent variable for expressing the distribution of the label information.

Thus, as an example, the following description explains inference of a parameter by adopting an EM algorithm in the embodiment as an algorithm developed by making latent variables a common variable. In this case, the latent variables made a common variable are a latent variable of the mixed normal distribution (GMM) for the distribution of the content characteristic quantity and a latent variable of the PLSA for the distribution of the label information.

Figure 7:
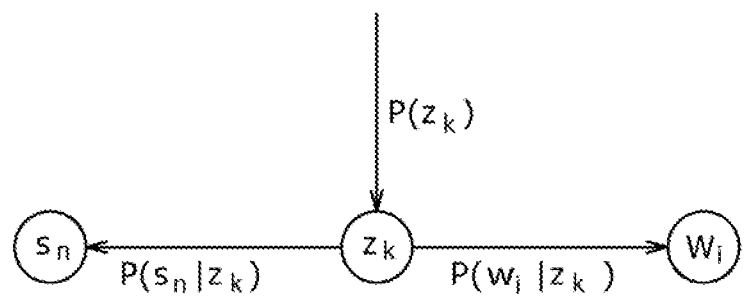
FIG. 7 is a diagram showing a typical graphical model for a case in which a latent variable is a variable common to a mixed normal distribution (GMM) of content characteristic quantities and a PLSA of label information.

FIG. 7 is a diagram showing a typical graphical model for a case in which a latent variable is a variable common to the mixed normal distribution (GMM) of the content characteristic quantity and the PLSA of the label information.

In the typical graphical model shown in FIG. 7, symbol $z_k$ (={z1, z2, z3, . . . $z_k$}) denotes latent variables. Symbol k denotes the number of individual latent variables z1, z2, z3, . . . $z_k$. In general, the individual latent variables z1, z2, z3, . . . $z_k$ are collectively referred to hereafter simply as a latent variable $z_k$. Symbol $s_n$ denotes a content, which is referred to hereafter as a content $s_n$. Symbol $w_i$ denotes a label, which is referred to hereafter as a label $w_i$. Symbol p $(S_n|z_k)$ denotes a conditional probability of the appearance of the content $s_n$. By the same token, symbol p $(w_i|z_k)$ denotes a conditional probability of the appearance of the label $w_i$. The latent variable $z_k$ determined by a pre-probability p $(z_k)$ is a latent variable common to the conditional probabilities p $(s_n|z_k)$ and p $(w_i|z_k)$.

That is to say, the latent variable $z_k$ associates the content $s_n$ with the label $w_i$.

Here, let us assume for example that the appearance of the label $w_i$ is determined from the latent variable $z_k$ by making use of the conditional probability p $(w_i|z_k)$. On the other hand, the distribution of the content characteristic quantity is determined by making use of an average vector for the latent variable $z_k$ and a variance—covariance matrix (such as a matrix showing variances of variables and covariances for combinations with all the variables). In this case, a co-occurrence probability of the content $s_n$ and the label $w_i$ is expressed by Eq. (1) given as follows.

[Eq. 1]

$$P(w_i, s_n) = \sum_k p(w_i | z_k) p(s_n | z_k) p(z_k) \quad (1)$$
$$= \sum_k p(w_i | z_k) \alpha_k N(f_n : \mu_k, s_k)$$

In Eq. (1), the pre-probability p ($z_k$) is equal to $\alpha_k$ (that is, p ($z_k$)=$\alpha_k$) and p ($s_n|z_k$) of the equation is expressed by Eq. (2) given as follows:

[Eq. 2]

$$p(s_n \mid z_k) = N(f_n; \mu_k, S_k) \quad (2)$$
$$= \frac{1}{(2\Pi)^{F/2} |S_k|^{1/2}} \exp\left(-\frac{1}{2}(f_n - \mu_k)^T S_x^{-1}(f_n - \mu_k)\right)$$

In Eq. (2), symbol $f_n$ denotes the content characteristic quantity of the nth content. Symbol $\mu_k$ denotes an average vector for the latent variable $z_k$. In the following description, the average vector for the latent variable $z_k$ is referred to as an average vector $\mu_k$. Symbol $S_k$ denotes a variance—covariance matrix for the latent variable $z_k$. In the following description, the variance—covariance matrix for the latent variable $z_k$ is referred to as a variance—covariance matrix $S_k$. Symbol F denotes the number of dimensions of the content characteristic quantity.

In this case, the Q function of the EM algorithm is expressed by Eq. (3) given as follows:

[Eq. 3]

$$Q(\theta \mid \theta^{(t)}) = \sum_n \sum_i c(w_i, s_n) \sum_k p(z_k \mid w_i, s_n; \theta^{(t)}) \log p(w_i, s_n, z_k; \theta) \quad (3)$$

It is to be noted that symbol c ($w_i$, $s_n$) denotes the number of times the label $w_i$ appears in the content $s_n$ or a weight. Symbol $\theta^{(t)}$ denotes a parameter in the tth repetition.

Thus, from Eq. (3), an E-step (Expectation Step) is expressed by Eq. (4) given as follows:

[Eq. 4]

$$p(z_k \mid w_i, s_n; \theta^{(t+1)}) = \frac{p(w_i \mid z_k)^{(t)} \alpha_k^{(t)} N(f_n; \mu_k^{(t)}, S_k^{(t)})}{\sum_j p(w_i \mid z_j)^{(t)} \alpha_j^{(t)} N(f_n; \mu_j^{(t)}, S_j^{(t)})} \quad (4)$$

On the other hand, an M-step (Maximization Step) is expressed by Eqs. (5), (6), (7) and (8) given as follows:

[Eq. 5]

$$\mu_k^{(t+1)} = \frac{\sum_n \sum_i c(w_i, s_n) p(z_k \mid w_i, s_n; \theta^{(t)}) f_n}{\sum_n \sum_i c(w_1, s_n) p(z_i \mid w_i, s_n; \theta^{(t)})} \quad (5)$$

[Eq. 6]

$$S_k^{(t+1)} = \frac{\sum_n \sum_i c(w_i, s_n) p(z_k \mid w_i, s_n; \theta^{(t)})(f_n - \mu_k)(f_n - \mu_k)^T}{\sum_n \sum_i c(w_i, s_n) p(z_k \mid w_i, s_n; \theta^{(t)})} \quad (6)$$

[Eq. 7]

$$\alpha_k^{(t+1)} = \frac{\sum_n \sum_i c(w_i, s_n) p(z_k \mid w_i, s_n; \theta^{(t)})}{\sum_n \sum_i c(w_i, s_n)} \quad (7)$$

[Eq. 8]

$$p(w_i \mid z_k)^{(t+1)} = \frac{\sum_n c(w_i, s_n) p(z_k \mid w_i, s_n; \theta^{(t)})}{\sum_n \sum_i c(w_i, s_n) p(z_k \mid w_i, s_n; \theta^{(t)})} \quad (8)$$

That is to say, the average vector $\mu_k$, the variance—covariance matrix $S_k$, $\alpha_k$ and p ($w_i|z_k$), which are associating information, are computed in accordance with Eqs. (5), (6), (7) and (8) respectively.

For example, at the step S21, on the basis of the content characteristic quantities stored in the content characteristic quantity storage unit 53 for each of 10 musical contents, i.e., contents 1 to 10, and the label information stored in the label information storage unit 55 for each of the 10 musical contents, the associating information computation unit 56 computes $\mu_k$, $S_k$, $\alpha_k$ and p ($w_i|z_k$) as associating information in accordance with Eqs. (1) to (8) for a case in which two latent variables z1 and z2 are used (or a two-dimensional latent variable is used). As shown in FIG. 4, the content characteristic quantities for each the musical contents are the speed, brightness and sound pressure of the musical content. On the other hand, the label information for each of the musical contents relates to the words "comfortable", "cheerful", "crazy", "heavy" and "light" as shown in FIG. 5.

By referring to FIGS. 8 to 13, the following description more concretely explains associating information computed by the associating information computation unit 56. First of all, typical locations of contents and labels in a latent space are described by referring to FIGS. 8 to 10.

FIG. 8 is a diagram showing an expression based on a latent space as a typical expression for contents. To put it concretely, FIG. 8 shows a latent-space expression of musical contents as typical values according to the conditional probability p ($z_k|s_n$).

In a typical table shown in FIG. 8, the first column and the first row each show items. The items shown on the first column are each the name of a musical content stored in the content storage unit 51. On the other hand, the items shown on the first row are two latent variables for each of the musical contents shown on the first column. The two latent variables are latent variables z1 and z2.

As values of the latent variable z1, the associating information computation unit 56 produces a typical computation result of 0.9 for content 1 shown on the second row, a typical computation result of 0.7 for content 2 shown on the third row, a typical computation result of 0.6 for content 3 shown on the fourth row, a typical computation result of 0.65 for content 4 shown on the fifth row, a typical computation result of 0.6 for content 5 shown on the sixth row, a typical computation result of 0.2 for content 6 shown on the seventh row, a typical computation result of 0.4 for content 7 shown on the eighth row, a typical computation result of 0.1 for content 8 shown on the ninth row, a typical computation result of 0.3 for content 9 shown on the tenth row and a typical computation result of 0.4 for content 10 shown on the eleventh row as shown in FIG. 8.

That is to say, each of contents 1 to 10 is associated with labels by the latent variable z1.

By the same token, as values of the latent variable z2, the associating information computation unit 56 produces a typical computation result of 0.1 for content 1 shown on the second row, a typical computation result of 0.3 for content 2 shown on the third row, a typical computation result of 0.4 for content 3 shown on the fourth row, a typical computation result of 0.35 for content 4 shown on the fifth row, a typical computation result of 0.4 for content 5 shown on the sixth row, a typical computation result of 0.8 for content 6 shown on the seventh row, a typical computation result of 0.6 for content 7 shown on the eighth row, a typical computation result of 0.8 for content 8 shown on the ninth row, a typical computation result of 0.7 for content 9 shown on the tenth row and a typical computation result of 0.6 for content 10 shown on the eleventh row as shown in FIG. 8.

That is to say, each of contents 1 to 10 is associated with labels by the latent variable $z2$.

FIG. 9 is a diagram showing an expression based on a latent space as a typical expression for label information. To put it concretely, FIG. 9 shows a latent-space expression of words included as labels in sentences reviewing musical contents as typical values of the conditional probability $p(z_k|w_i)$.

In a typical table shown in FIG. 9, the first column and the first row each show items. The items shown on the first column are each a label used in sentences reviewing musical contents stored in the content storage unit 51. On the other hand, the items shown on the first row are the two latent variables for each of the labels shown on the first column. The two latent variables are latent variables $z1$ and $z2$.

As values for the latent variable $z1$, the associating information computation unit 56 produces a typical computation result of 0.1 for the word "comfortable" shown on the second row, a typical computation result of 0.7 for the word "cheerful" shown on the third row, a typical computation result of 0.7 for the word "crazy" shown on the fourth row, a typical computation result of 0.2 for the word "heavy" shown on the fifth row and a typical computation result of 0.9 for the word "light" shown on the sixth row as shown in FIG. 9.

That is to say, each of the words "comfortable", "cheerful", "crazy", "heavy" and "light" each used as a label is associated with musical contents by the latent variable $z1$.

By the same token, as values for the latent variable $z2$, the associating information computation unit 56 produces a typical computation result of 0.9 for the word "comfortable" shown on the second row, a typical computation result of 0.3 for the word "cheerful" shown on the third row, a typical computation result of 0.3 for the word "crazy" shown on the fourth row, a typical computation result of 0.8 for the word "heavy" shown on the fifth row and a typical computation result of 0.1 for the word "light" shown on the sixth row as shown in FIG. 9.

That is to say, each of the words "comfortable", "cheerful", "crazy", "heavy" and "light" each used as a label is associated with musical contents by the latent variable $z2$.

FIG. 10 is a diagram showing typical pre-probabilities for latent variables $z_k$. To put it concretely, FIG. 10 shows typical values of the pre-probability $p(z_k)=\alpha_k$.

As shown on the second row of a table given in FIG. 10, the pre-probability $p(z_k)=\alpha_k$ is typically 0.48 for the latent variable $z1$ used as one of two latent variables $z_k$, and typically 0.52 for the latent variable $z2$ used as the other latent variable.

In this way, with the latent variables $z1$ and $z2$ used as 2 latent variables $z_k$, the associating information computation unit 56 places musical contents (namely, contents 1 to 10) and labels (i.e., the words "comfortable", "cheerful", "crazy", "heavy" and "light") in a latent space by making use of Eqs. (1) to (8).

In addition, as described above, the associating information computation unit 56 computes an average vector $\mu_k$ and a variance—covariance matrix $S_k$ as associating information. By referring to FIGS. 11 to 13, the following description explains concrete examples of the average vector $\mu_k$ and the variance—covariance matrix $S_k$.

First of all, by referring to FIGS. 11 and 12, the following description explains the variance—covariance matrix $S_k$ output by the associating information computation unit 56 as a matrix for the latent variables $z_k$.

FIG. 11 is a diagram showing a typical variance—covariance matrix $S_1$ for a latent variable $z1$.

In a typical table shown in FIG. 11, the first column and the first row each show items. The items shown on the first column are each (the name) of a content characteristic quantity of a musical content stored in the content storage unit 51. On the other hand, the items shown on the first row are each (the name) of a content characteristic quantity of a musical content stored in the content storage unit 51.

As shown on the second row of a table given in FIG. 11, as elements of the variance—covariance matrix $S_1$, the associating information computation unit 56 produces a typical computation result of 80 for the speed column and the speed row, a typical computation result of −30 for the speed column and the brightness row, and a typical computation result of 5 for the speed column and the sound pressure row.

In addition, by the same token, as shown on the third row of a table given in FIG. 11, as elements of the variance—covariance matrix $S_1$, the associating information computation unit 56 produces a typical computation result of −30 for the brightness column and the speed row, a typical computation result of 100 for the brightness column and the brightness row, and a typical computation result of −10 for the brightness column and the sound-pressure row. The computation result of −30 is the same as the element at the intersection of the second row and the third column.

On top of that, in the same way, as shown on the fourth row of a table given in FIG. 11, as elements of the variance—covariance matrix $S_1$, the associating information computation unit 56 produces a typical computation result of 5 for the sound-pressure column and the speed row, a typical computation result of −10 for the sound-pressure column and the brightness row, and a typical computation result of 50 for the sound-pressure column and the sound-pressure row. The computation result of 5 is the same as the element at the intersection of the second row and the fourth column whereas the computation result of −10 is the same as the element at the intersection of the third row and the fourth column.

FIG. 12 is a diagram showing a typical variance—covariance matrix $S_2$ for a latent variable $z2$.

In a typical table shown in FIG. 12, the first column and the first row each show the same items as a table shown in FIG. 11. Thus, the explanation of the items is omitted.

As shown on the second row of a table given in FIG. 12, as elements of the variance—covariance matrix $S_2$, the associating information computation unit 56 produces a typical computation result of 30 for the speed column and the speed row, a typical computation result of 30 for the speed column and the brightness row and a typical computation result of 10 for the speed column and the sound-pressure row.

In addition, by the same token, as shown on the third row of a table given in FIG. 12, as elements of the variance—covariance matrix $S_2$, the associating information computation unit 56 produces a typical computation result of 30 for the brightness column and the speed row, a typical computation result of 90 for the brightness column and the brightness row and a typical computation result of 0 for the brightness column and the sound-pressure row. The computation result of 30 is the same as the element at the intersection of the second row and the third column.

On top of that, in the same way, as shown on the fourth row of a table given in FIG. 12, as elements of the variance—covariance matrix $S_2$, the associating information computation unit 56 produces a typical computation result of 10 for the sound-pressure column and the speed row, a typical computation result of 0 for the sound-pressure column and the brightness row and a typical computation result of 50 for the sound-pressure column and the sound-pressure row. The computation result of 10 is the same as the element at the intersection of the second row and the fourth column whereas the computation result of 0 is the same as the element at the intersection of the third row and the fourth column.

Figures 13, 14:
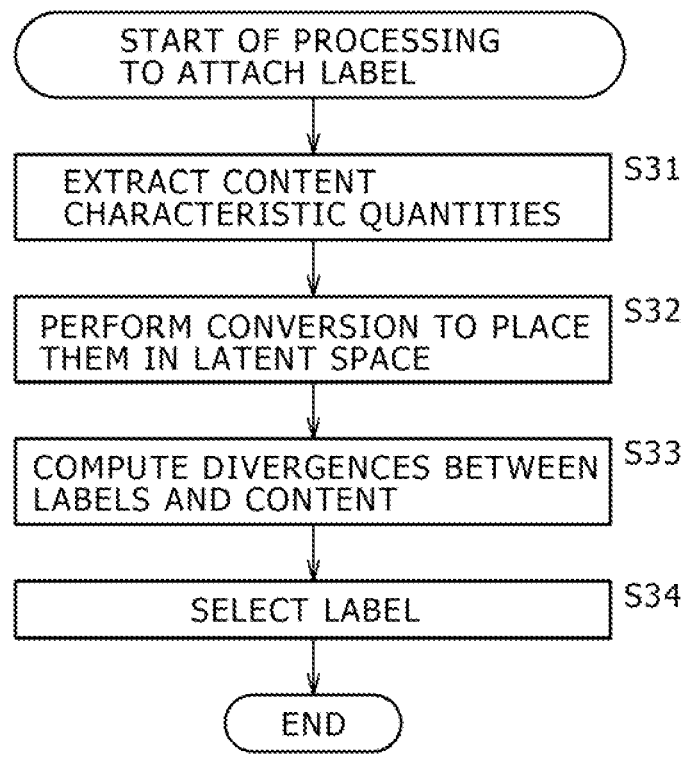
FIG. 13 is a diagram showing typical average vectors $\mu_1$ and $\mu_2$ computed by an associating information computation unit.
FIG. 14 shows a flowchart to be referred in explanation of processing carried out by the content providing apparatus to assign a label to a certain content.

By referring to FIG. 13, the following description explains average vectors $\mu_k$ computed by the associating information computation unit 56 as average vectors for the latent variables $z_k$. To be more specific, FIG. 13 is a diagram showing a typical average vector $\mu_1$ for the latent variable z1 and a typical average vector $\mu_2$ for the latent variable z2.

As shown on the second column of a table given in FIG. 13, as the values of the average vector $\mu_1$ for the latent variable z1, the associating information computation unit 56 produces a typical computation result of 58 for the speed on the second row, a typical computation result of 63 for the brightness on the third row and a typical computation result of 59 for the sound pressure on the fourth row.

In addition, by the same token, as shown on the third column of a table given in FIG. 13, as the values of the average vector $\mu_2$ for the latent variable z2, the associating information computation unit 56 produces a typical computation result of 42 for the speed on the second row, a typical computation result of 39 for the brightness on the third row and a typical computation result of 40 for the sound pressure on the fourth row.

As described above, the associating information computation unit 56 computes the variance—covariance matrix $S_1$ and the average vector $\mu_1$ for the latent variable z1 as well as the variance—covariance matrix $S_2$ and the average vector $\mu_2$ for the latent variable z2.

In the embodiment described above, the processing carried out by the associating information computation unit 56 to compute associating information is explained as a typical combination of the mixed normal distribution (GMM) and the PLSA. It is to be noted, however, that the distribution of the content characteristic quantity is not always a normal distribution. For example, a SAM (Semantic Aggregation Model) or another parametric distribution can be applied as the distribution of the content characteristic quantity. In addition, the model for inferring a parameter is also by no means limited to the EM algorithm described above. That is to say, the model for inferring a parameter can adopt another technique.

Figure 6:
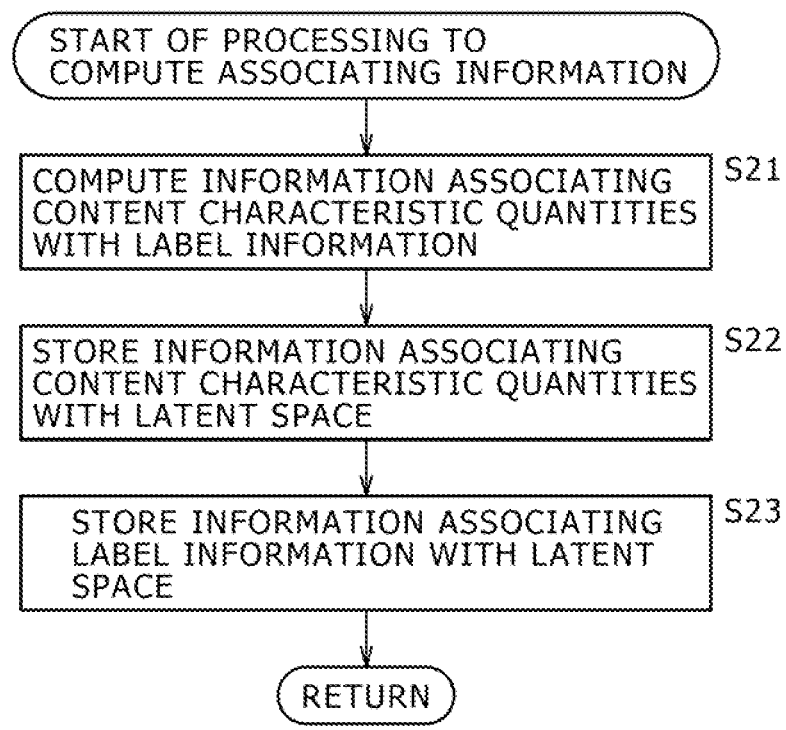
FIG. 6 shows a flowchart to be referred to in explanation of details of processing to compute associating information.

Let us refer back to the flowchart shown in FIG. 6. At a step S22, the associating information computation unit 56 stores the computed information associating content characteristic quantities with a latent space in the content characteristic quantity—latent space associating information storage unit 57.

For example, the associating information computation unit 56 stores the pre-probability values $\alpha_k$, the variance—covariance matrixes $S_k$ and average vectors $\mu_k$ in the content characteristic quantity—latent space associating information storage unit 57 as associating information found for the latent variables $z_k$. To put it concretely, in the case of the typical associating information described above, the associating information computation unit 56 stores the pre-probability values a1 and $\alpha_2$ shown in FIG. 10, the variance—covariance matrix $S_1$ shown in FIG. 11, the variance—covariance matrix $S_2$ shown in FIG. 12 and the average vectors $\mu_1$ and $\mu_2$ shown in FIG. 13 in the content characteristic quantity—latent space associating information storage unit 57.

Then, at the next step S23, the associating information computation unit 56 stores the computed information associating the label information with the latent space in the label information—latent space associating information storage unit 58. Then, the associating information computation unit 56 finally ends the processing to compute the associating information.

For example, at the step S23, as the associating information, the associating information computation unit 56 stores the conditional probabilities p ($w_i|z_k$) and the pre-probability values $\alpha_k$=p ($z_k$) for all combinations of the latent variables $z_k$ and the labels $w_i$ in the label information—latent space associating information storage unit 58. To put it concretely, in the case of the typical associating information described above, the associating information computation unit 56 stores the conditional probabilities p ($w_i|z_k$) like the ones shown in FIG. 9 as the conditional probabilities p ($w_i|z_k$) of the latent variables $z_1$ and $z_2$ and the label words "comfortable", "cheerful", "crazy", "heavy" and "light" as well as the pre-probabilities $\alpha_k$=p ($z_k$) shown in FIG. 10.

It is to be noted that the expression of a content in a latent space is the conditional probability p ($z_k|s_n$) whereas the expression of a label in the latent space is the conditional probability p ($z_k|w_i$) where k=1, 2, . . . k.

As described above, by carrying out a learning process, the content providing apparatus 1 stores associating information for content characteristic quantities in the content characteristic quantity—latent space associating information storage unit 57 and associating information for label information in the label information—latent space associating information storage unit 58.

In other words, by carrying out the learning process, the content providing apparatus 1 integrates the content characteristic quantities having a distribution and the label information having a distribution different from the distribution of the content characteristic quantities in one latent space by making use of latent variables $z_k$. As a result, the content providing apparatus 1 associates contents with labels.

In this way, at the learning phase, the content providing apparatus 1 integrates the content characteristic quantities having a distribution and the label information having a distribution different from the distribution of the content characteristic quantities by making use of the latent space (or the latent variables $z_k$).

Figures 15, 16:
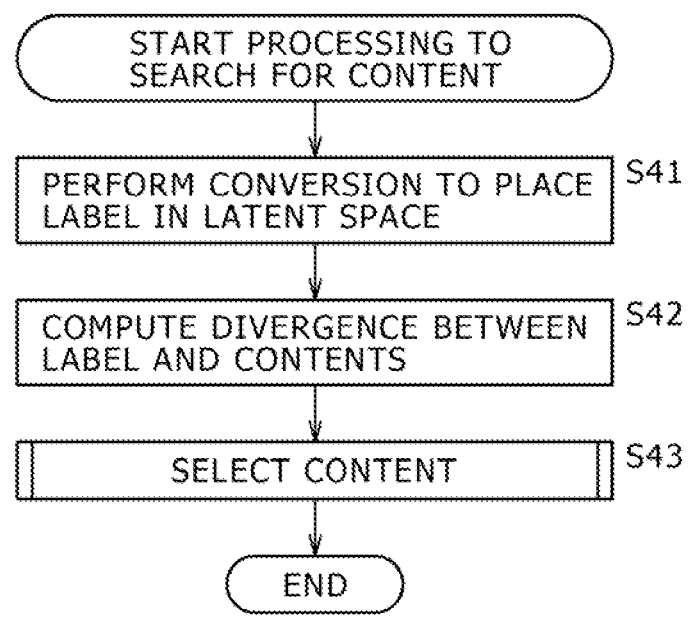
FIG. 15 is a diagram showing divergences computed by a latent-space divergence computation unit as typical divergences between a content and labels.
FIG. 16 shows a flowchart to be referred in explanation of processing carried out by the content providing apparatus to search for content.

Next, the operation phase is explained by referring to FIGS. 14 to 16 as mentioned before. The description of the operation phase begins with explanation of processing to assign a label to a content (a musical content). Then, the explanation of processing to assign a label to a content is followed by a description of the processing to search for a content (a musical content) matching a given keyword (a label).

First of all, the processing carried out by the content providing apparatus 1 to assign a label to a musical content is explained by referring to a flowchart shown in FIG. 14. The processing is started typically when the user adds a new musical content.

At a step S31, the content characteristic quantity extraction unit 52 extracts content characteristic quantities from a content and stores (saves) the extracted content characteristic quantities in the content characteristic quantity storage unit 53.

For example, at the step S31, the content characteristic quantity extraction unit 52 extracts content characteristic quantities $f_{NEW}$=(the speed, the brightness and the sound pressure)=(55, 65, 45) from a newly added musical content $S_{NEW}$ and stores the extracted content characteristic quantities $f_{NEW}$ in the content characteristic quantity storage unit 53.

In other words, the processing carried out by the content characteristic quantity extraction unit 52 to extract the content characteristic quantities from the newly added musical content $S_{NEW}$ can be said to be processing to store a vector for the new musical content $S_{NEW}$ in the content characteristic quantity storage unit 53.

Then, at a step S32, on the basis of associating information stored in the content characteristic quantity—latent space associating information storage unit 57, the content characteristic quantity—latent space conversion unit 59 carries out a conversion process to place the extracted content characteristic quantities in a latent space and supplies a result of the conversion process to the latent space divergence computation unit 61.

For example, at the step S32, the content characteristic quantity—latent space conversion unit 59 makes use of the variance—covariance matrixes $S_k$ and average vectors $\mu_k$ to carry out a conversion process (or a mapping process) of placing the extracted content characteristic quantities $f_{NEW}$= (55, 65, 45) in the latent space. The variance—covariance matrixes $S_k$ and average vectors $\mu_k$ are associating information stored in the content characteristic quantity—latent space associating information storage unit 57. Examples of the variance—covariance matrixes are the variance—covariance matrix $S_1$ shown in FIG. 11 and the variance—covariance matrix $S_2$ shown in FIG. 12 whereas examples of the average vectors $\mu_k$ are the average vectors $\mu_1$ and $\mu_2$ shown in FIG. 13.

To put it concretely, the process of conversion from the content characteristic quantities to the latent space is a computation process making use of distribution parameters obtained from a learning process explained earlier by referring to the flowchart shown in FIG. 3 in accordance with Eq. (9) given as follows.

[Eq. 9]

$$p(z_k \mid s_n) = \frac{p(s_n \mid z_k)p(z_k)}{p(s_n)} \propto p(s_n \mid z_k)p(z_k) \quad (9)$$
$$= \alpha_k N(f_n; \mu_k, S_k)$$

That is to say, each of the conditional probabilities p $(z_1|S_{NEW})$ and p $(z_2|S_{NEW})$ are computed in accordance with Eq. (9).

$p(z_1|S_{NEW})=p(z_1)N(f_{NEW},\mu_1,S_1)=0.48\times1.48\times10^{-5}=7.09\times10^{-6}$ $p(z_2|S_{NEW})=p(z_2)N(f_{NEW},\mu_2,S_2)=0.52\times2.98\times10^{-6}=1.43\times10^{-6}$ Then, conditional probabilities p $(z_1|S_{NEW})=7.09\times10^{-6}$ and p $(z_2|S_{NEW})=1.43\times10^{-6}$ obtained as results of the above computation are normalized to give a conditional probability p $(z_1|S_{NEW})=(0.83, 0.17)$.

It is to be noted that, since the pre-probability p $(s_n)$ of a musical content is generally not clear, all of them are handled as equiprobabilities. However, the conditional probabilities may be computed by using a distribution of all observed values.

At the next step S33, on the basis of conversion-process results received from the content characteristic quantity—latent space conversion unit 59 as the results of the conversion process to place the content characteristic quantities in the latent space and the associating information stored in the label information—latent space associating information storage unit 58, the latent space divergence computation unit 61 computes a divergence between the content and each label and supplies the computed divergences to the label selection unit 62.

To put it concretely, the divergence between a content and a label is computed typically as the conditional probability of the label in accordance with Eq. (10) given as follows.

[Eq. 10]

$$p(w_i \mid s_n) = \sum_k p(w_i \mid z_k)p(z_k \mid s_n) \propto \sum_k p(w_i \mid z_k)\alpha_k N(f_n; \mu_k, S_k) \quad (10)$$

The computation of the divergence between a content and a label is by no means limited to the computation according to Eq. (10) given above. For example, the divergence between a content and a label can also be computed as a Kullback-Leibler Divergence or a Jensen-Shannon Divergence also referred to hereafter simply as a JS divergence. The Kullback-Leibler Divergence and the JS divergence are a divergence between the conditional probability p $(z_k|s_n)$ representing the expression of a content in the latent space and the conditional probability p $(z_k|w_i)$ representing the expression of a label in the latent space.

For example, the Kullback-Leibler Divergence is computed in accordance with Eq. (11) given as follows.

[Eq. 11]

$$KL(p(z \mid s_n) \mid p(z \mid w_i)) = \sum_k p(z_k \mid s_n)\log\frac{p(z_k \mid s_n)}{p(z_k \mid w_i)} \quad (11)$$

On the other hand, the JS divergence is typically computed in accordance with Eq. (12) given as follows.

[Eq. 12]

$$JS(p(z \mid s_n) \mid p(z \mid w_i)) = KL\left(p(z \mid s_n) \mid \frac{1}{2}p(z \mid s_n) + \frac{1}{2}p(z \mid w_i)\right) \quad (12)$$

It is to be noted that, in actuality, even though the latent space is not an Euclid space, in order to simplify the computation process, the divergence between a content and a label can also be computed for example as an Euclid divergence or a sum of differences corresponding to K, which is the number of latent variables.

That is to say, on the basis of the conditional probability p $(z_k|S_{NEW})=(0.83, 0.17)$ received from the content characteristic quantity—latent space conversion unit 59 and the conditional probability p $(w_i|z_k)$ and the pre-probability value $\alpha_k=p(z_k)$, which are stored in the label information—latent space associating information storage unit 58, the latent space divergence computation unit 61 computes a divergence (or, strictly speaking, a JS divergence) between the content and each label, which exist in the latent space, by making use of Eq. (12).

FIG. 15 is a diagram showing divergences each computed by the latent-space divergence computation unit as a typical divergence between a content and a label.

In a typical table shown in FIG. 15, for example, the first column shows labels (or words) stored in the label information—latent space associating information storage unit 58 and the second column shows divergences computed by the latent space divergence computation unit 61 as the divergences between a content and the labels shown on the first row. It is to be noted that FIG. 15 shows typical divergences each computed in accordance with Eq. (12) as the JS divergences between the content and one of the labels.

As shown in FIG. 15, the latent space divergence computation unit 61 gives a typical JS divergence of 0.3000 shown on the second row as a divergence between the musical content $S_{NEW}$ and the label word of "comfortable", a typical JS divergence of 0.0119 shown on the third row as a divergence between the musical content $S_{NEW}$ and the label word of "cheerful" and a typical JS divergence of 0.0119 shown on the fourth row as a divergence between the musical content $S_{NEW}$ and the label word of "crazy".

By the same token, as shown in FIG. 15, the latent space divergence computation unit 61 gives a typical JS divergence of 0.2150 shown on the fifth row as a divergence between the musical content $S_{NEW}$ and the label word of "heavy" and a typical JS divergence of 0.0053 shown on the sixth row as a divergence between the musical content $S_{NEW}$ and the label word of "light".

In this way, for example, the latent space divergence computation unit 61 produces the computed divergences shown in FIG. 15 as the divergences between a content and labels, supplying the divergences to the label selection unit 62.

Let us refer back to the flowchart shown in FIG. 14. At a step S34, on the basis of the resulting divergences received from the latent space divergence computation unit 61, the label selection unit 62 selects a label. Then, the processing to assign a label to a content is finally ended.

Let us assume for example that the resulting divergences received from the latent space divergence computation unit 61 are the divergences shown in FIG. 15 as the divergences between a content and labels. In this case, at the step S34, the label selection unit 62 selects the label word of "light" with a typical JS divergence of 0.0053 and the label word of "cheerful" with a typical JS divergence of 0.0119 as two labels each having a small JS divergence, assigning the selected labels to the newly added musical content $S_{NEW}$.

It is to be noted that the number of labels to be assigned to the newly added musical content $S_{NEW}$ is by no means limited to two described above. For example, any number of labels can be selected as a divergence between the content and the label as long as the labels each have a divergence smaller than a threshold value. As an alternative, N labels can be selected as labels having smallest divergences among all labels where N is an integer.

In addition, a label selected by the label selection unit 62 as a label assigned to a content can typically be displayed on the screen of the output unit in order to allow the user to look at the label directly. As an alternative, the label is saved as metadata to be used for example in a process to search for the content to which the label has been assigned.

In this way, the content providing apparatus 1 assigns a more optimum label to a content.

As described above, by virtue of a latent space (or latent variables) reflecting characteristics of distribution of content characteristic quantities and characteristics of distribution of label information, the content providing apparatus 1 is capable of assigning a more optimum label even to a content having no label. As a result, since the amount of the manual work to assign a keyword (or a label) to a content can be reduced, the cost can also be decreased as well.

By referring to a flowchart shown in FIG. 16, the following description explains processing carried out by the content providing apparatus 1 to search for a content. It is to be noted that this processing is started for example when the user enters a command to search for a content matching a predetermined label by operating a user interface.

At a step S41, the label information—latent space conversion unit 60 carries out a conversion process to place a processed label in the latent space on the basis of associating information stored in the label information—latent space associating information storage unit 58 and supplies a result of the conversion process to the latent space divergence computation unit 61.

Let us assume for example that the user enters the label word of "cheerful" as a command. In this case, at the step S41, on the basis of the conditional probability p ($w_i|z_k$) and the pre-probability value $\alpha_k$=p ($z_k$), which are stored in the label information—latent space associating information storage unit 58 for each combination of the latent variables $z_k$ and the label $w_i$, the label information—latent space conversion unit 60 carries out a conversion (mapping) process to place the label word of "cheerful" in the latent space and supplies the conditional probabilities p ($z_k|w_i$) to the latent space divergence computation unit 61 as a result of the conversion process.

To put it concretely, the conversion (mapping) process is carried out in accordance with Eq. (13) given as follows:

[Eq. 13]

$$p(z_k \mid w_i) = \frac{p(w_i \mid z_k)p(z_k)}{p(w_i)} \propto p(w_i \mid z_k)p(z_k) \quad (13)$$

It is to be noted that, since the pre-probability p ($w_i$) is generally not clear, all of them are handled as equiprobabilities. However, the computation can be carried out by using a distribution of all observed values.

At a step S42, on the basis of conversion-process results received from the label information—latent space conversion unit 60 as results of the conversion process to place the label information in the latent space and the associating information stored in the content characteristic quantity—latent space associating information storage unit 57, the latent space divergence computation unit 61 computes divergences between the label and contents and supplies the computed divergences to the content selection unit 63.

Let us assume for example that the conversion-process results received from the label information—latent space conversion unit 60 are the conditional probabilities p ($z_k|w_i$) whereas the associating information stored in the content characteristic quantity—latent space associating information storage unit 57 is the pre-probability value $\alpha_k$, the variance—covariance matrix $S_k$ and the average vector $\mu_k$ for every latent variable $z_k$. In this case, at the step S42, the latent space divergence computation unit 61 computes the divergences between the contents and the label, which exist in the latent space, on the basis of the conditional probabilities p ($z_k|w_i$) as well as pre-probability values $\alpha_k$, the variance—covariance matrixes $S_k$ and the average vectors $\mu_k$ in accordance with Eq. (12).

It is to be noted that, methods for computing the divergences between a content and a label are by no means limited to the method to compute a JS divergence in accordance with Eq. (12) as is the case with the processing carried out at the step S33 shown in FIG. 14. That is to say, the divergence between a content and a label can also be computed as the conditional probability of a label in accordance with Eq. (10), the Kullback-Leibler Divergence in accordance with Eq. (11), an Euclid divergence or another divergence.

FIG. 17 is a diagram showing typical divergences computed by the latent-space divergence computation unit 61 as typical divergences between contents and a label when the user enters the words "cheerful" as the label.

The latent space divergence computation unit 61 gives a typical JS divergence of 0.3100 on the second row of a table shown in FIG. 17 as the divergence between content 1 and the word "cheerful" entered as a label. By the same token, the latent space divergence computation unit 61 gives a typical JS divergence of 0.0051 on the third row of a table shown in FIG. 17 as the divergence between content 2 and the word "cheerful" entered as a label. In the same way, the latent space divergence computation unit 61 gives a typical JS divergence of 0.0022 on the fourth row of a table shown in FIG. 17 as the divergence between content 3 and the word "cheerful" entered as a label. Likewise, the latent space divergence computation unit 61 gives a typical JS divergence of 0.1114 on the fifth row of a table shown in FIG. 17 as the divergence between content 4 and the word "cheerful" entered as a label. Similarly, the latent space divergence computation unit 61 gives a typical JS divergence of 0.2547 on the sixth row of a table shown in FIG. 17 as the divergence between content 5 and the word "cheerful" entered as a label.

Likewise, the latent space divergence computation unit 61 gives a typical JS divergence of 0.0947 on the seventh row of a table shown in FIG. 17 as the divergence between content 6 and the word "cheerful" entered as a label. By the same token, the latent space divergence computation unit 61 gives a typical JS divergence of 0.1473 on the eighth row of a table shown in FIG. 17 as the divergence between content 7 and the word "cheerful" entered as a label. In the same way, the latent space divergence computation unit 61 gives a typical JS divergence of 0.4123 on the ninth row of a table shown in FIG. 17 as the divergence between content 8 and the word "cheerful" entered as a label. Likewise, the latent space divergence computation unit 61 gives a typical JS divergence of 0.1119 on the tenth row of a table shown in FIG. 17 as the divergence between content 9 and the word "cheerful" entered as a label. Similarly, the latent space divergence computation unit 61 gives a typical JS divergence of 0.3451 on the eleventh row of a table shown in FIG. 17 as the divergence between content 10 and the word "cheerful" entered as a label.

Likewise, the latent space divergence computation unit 61 gives a typical JS divergence of 0.0049 on the twelfth row of a table shown in FIG. 17 as the divergence between content 11 and the word "cheerful" entered as a label. Content 11 is a newly added musical content $S_{NEW}$ to which the words "light" and "cheerful" have each been assigned as a label in the processing represented by the flowchart shown in FIG. 14.

As described above, the latent space divergence computation unit 61 produces typical divergences like the ones shown in FIG. 17 between a label and contents, supplying the divergences to the content selection unit 63.

Let us refer back to the flowchart shown in FIG. 16. At a step S43, on the basis of the divergences received from the latent space divergence computation unit 61 as results of divergence computation, the content selection unit 63 selects a content. Then, the processing to search for a content is finally ended.

Let us assume that the divergences received by the content selection unit 63 from the latent space divergence computation unit 61 as results of divergence computation are the JS divergences shown in FIG. 17 as divergences between a label and contents. In this case, at the step S43, the content selection unit 63 selects three contents, i.e., content 3 having a typical JS divergence of 0.0022, content 11 having a typical JS divergence of 0.0049 and content 2 having a typical JS divergence of 0.0051, displaying information on the selected contents typically on the screen of the output unit 17.

It is to be noted that the number of selected contents is by no means limited to three. For example, any number of contents can be selected as long as the contents each have a divergence smaller than a threshold value as a divergence between the content and the label. As an alternative, N contents can be selected as contents having smallest divergences among all contents where N is an integer.

In addition, as described above, contents to be selected are not limited to contents used at the learning phase. That is to say, a content newly added later at the operation phase can also be taken as a candidate for a content to be selected. An example of the content newly added later at the operation phase is the musical content $S_{NEW}$.

In addition, it is possible to provide a configuration in which a model is constructed in advance as a supplementary model including a larger number of labels by making use of other data. If the label is a word, the other data can be a text in an area to which a general corpus and/or its content pertain. In this case, if the label specified by the user does not exist in the label information—latent space associating information storage unit 58, a known label included in the supplementary model as a label closest to the specified unknown label can be used in a query given to the user as a substitute for the specified label. The known label is a label known at a learning process.

In this way, the content providing apparatus 1 searches for a content for a specified label.

As described above, by virtue of a latent space (or latent variables) reflecting characteristics of distribution of content characteristic quantities and characteristics of distribution of label information, the content providing apparatus 1 is capable of searching for a content for a specified label.

By the way, in the embodiment described above, content characteristic quantities are associated with label information. However, implementations of the present invention are by no means limited to the embodiment. For example, label information and/or content characteristic quantities can be associated with context information to be described later. As an alternative, label information and/or content characteristic quantities can be associated with favorite information also to be described later.

First of all, association of label information and/or content characteristic quantities with context information is described by referring to FIGS. 18 to 21.

Figure 18:
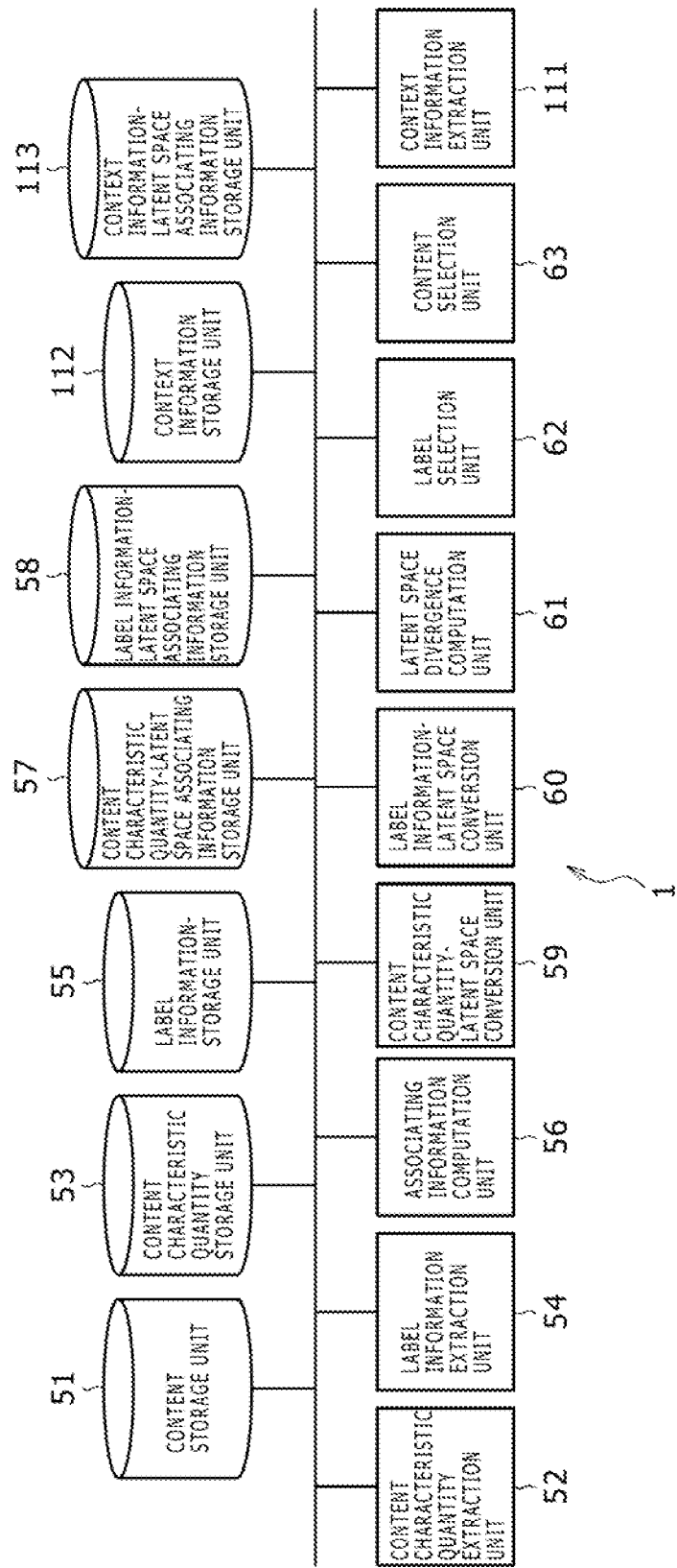
FIG. 18 is a functional block diagram showing another typical functional configuration of the content providing apparatus.

FIG. 18 is a functional block diagram showing another typical functional configuration of the content providing apparatus 1.

It is to be noted that configuration elements placed at the same positions in the configuration shown in FIG. 18 as their counterparts shown in FIG. 2 and denoted by the same reference numerals as the counterparts are not explained again in order to avoid duplications of explanation. The content providing apparatus 1 shown in FIG. 18 is obtained by adding a context information extraction unit 111, a context information storage unit 112 and a context information—latent space association information storage unit 113 to the configuration shown in the block diagram of FIG. 2.

The context information extraction unit 111 extracts context information, which is information related to contents stored in the content storage unit 51. The context information extraction unit 111 stores (or saves) the extracted context information in the context information storage unit 112.

The context information related to a content is defined as information, which is obtained as information other than information on the content itself when the user utilizes the content. An example of the context information is information on the time, the season, the place, the weather, the feeling and a person present on the occasion of the content utilization.

The associating information computation unit 56 computes information associating content characteristic quantities stored in the content characteristic quantity storage unit 53 with label information stored in the label information storage unit 55. The associating information computation unit 56 stores (or saves) the associating information computed for the content characteristic quantities in the content characteristic quantity—latent space associating information storage unit 57 and the associating information computed for the label information in the label information—latent space associating information storage unit 58.

In addition, the associating information computation unit 56 computes information associating context information stored in the context information storage unit 112 with label information stored in the label information storage unit 55. The associating information computation unit 56 stores (or saves) the associating information computed for the label information in the label information—latent space associating information storage unit 58 and the associating information computed for the context information in the context information—latent space association information storage unit 113.

On top of that, the associating information computation unit 56 computes information associating content characteristic quantities stored in the content characteristic quantity storage unit 53 with context information stored in the context information storage unit 112. The associating information computation unit 56 stores (or saves) the associating information computed for the content characteristic quantities in the content characteristic quantity—latent space associating information storage unit 57 and the associating information computed for the context information in the context information latent space association information storage unit 113.

It is to be noted that, in this case, the associating information associates contents, labels and contexts with each other. That is to say, the associating information links contents, labels and contexts with each other by making use of latent variables $z_k$.

In the embodiment described above, the content characteristic quantity—latent space associating information storage unit 57, the label information—latent space associating information storage unit 58 and the context information—latent space association information storage unit 113 are separated from each other. It is to be noted, however, that the content characteristic quantity—latent space associating information storage unit 57, the label information—latent space associating information storage unit 58 and the context information—latent space association information storage unit 113 can also be integrated into a single unit. In this case, the single unit obtained as a result of integrating the content characteristic quantity—latent space associating information storage unit 57, the label information—latent space associating information storage unit 58 and the context information—latent space association information storage unit 113 is used for storing all pieces of associating information.

Next, a learning process carried out by the content providing apparatus 1 shown in FIG. 18 is explained by referring to a flowchart shown in FIG. 19 as follows.

Processes carried out at steps S51 and S52 are respectively identical with the processes carried out at the steps S11 and S12 shown in FIG. 3. Thus, explanation of the steps S51 and S52 is omitted.

At a step S53, the context information extraction unit 111 extracts context information related to contents stored in the content storage unit 51 and stores (or saves) the extracted context information in the context information storage unit 112. For example, the context information extracted by the context information extraction unit 111 at the step S53 as context information related to a musical content stored in the content storage unit 51 is a time band in which the musical content was listened to or a place at which the musical content was listened to. The context information extraction unit 111 stores the extracted information on the time band or the extracted information on the place in the context information storage unit 112 as context information.

To put it concretely, let us assume for example that musical contents stored in the content storage unit 51 are contents 1 to 10. In this case, the context information extraction unit 111 extracts context information like typical one shown in FIG. 20.

FIG. 20 is a diagram showing typical context information for musical contents.

In a typical table shown in FIG. 20, the first column and the first row each show items. The items shown on the first column are each the name of a musical content stored in the content storage unit 51. On the other hand, the items shown on the first row are each the name of context information related to each of the musical contents shown on the first column. The names of the context information are morning, daytime, night, home, outdoors and commuting. The morning, daytime and night context information are information on a time band in which the musical content was listened to. On the other hand, the home, outdoor and commuting information are information on a place at which the musical content was listened to.

As shown on the second row of FIG. 20, the context information extraction unit 111 extracts typical context information indicating that content 1 was listened to three times, four times and two times in the morning, daytime and night time bands respectively and two times, three times and four times in the music listening areas of the home, the outdoors and the commuting respectively. By the same token, as shown on the third row of FIG. 20, the context information extraction unit 111 extracts typical context information indicating that content 2 was listened to five times, four times and two times in the morning, daytime and night time bands respectively and three times, two times and three times in the music listening areas of the home, the outdoors and the commuting respectively. In the same way, as shown on the fourth row of FIG. 20, the context information extraction unit 111 extracts typical context information indicating that content 3 was listened to three times, three times and one time in the morning, daytime and night time bands respectively and three times, three times and five times in the music listening areas of the home, the outdoors and the commuting respectively. Likewise, as shown on the fifth row of FIG. 20, the context information extraction unit 111 extracts typical context information indicating that content 4 was listened to four times, three times and two times in the morning, daytime and night time bands respectively and two times, three times and three times in the music listening areas of the home, the outdoors and the commuting respectively.

By the same token, as shown on the sixth row of FIG. 20, the context information extraction unit 111 extracts typical context information indicating that content 5 was listened to four times, two times and three times in the morning, daytime and night time bands respectively and two times, two times and four times in the music listening areas of the home, the outdoors and the commuting respectively. In the same way, as shown on the seventh row of FIG. 20, the context information extraction unit 111 extracts typical context information indicating that content 6 was listened to two times, three times and four times in the morning, daytime and night time bands respectively and three times, three times and two times in the music listening areas of the home, the outdoors and the commuting respectively. Likewise, as shown on the eighth row of FIG. 20, the context information extraction unit 111 extracts typical context information indicating that content 7 was listened to three times, one time and three times in the morning, daytime and night time bands respectively and three times, three times and two times in the music listening areas of the home, the outdoors and the commuting respectively.

By the same token, as shown on the ninth row of FIG. 20, the context information extraction unit 111 extracts typical context information indicating that content 8 was listened to one time, two times and five times in the morning, daytime and night time bands respectively and four times, three times and three times in the music listening areas of the home, the outdoors and the commuting respectively. In the same way, as shown on the tenth row of FIG. 20, the context information extraction unit 111 extracts typical context information indicating that content 9 was listened to two times, two times and four times in the morning, daytime and night time bands respectively and five times, two times and two times in the music listening areas of the home, the outdoors and the commuting respectively. Likewise, as shown on the eleventh row of FIG. 20, the context information extraction unit 111 extracts typical context information indicating that content 10 was listened to one time, two times and three times in the morning, daytime and night time bands respectively and four times, three times and three times in the music listening areas of the home, the outdoors and the commuting respectively.

Figure 19:
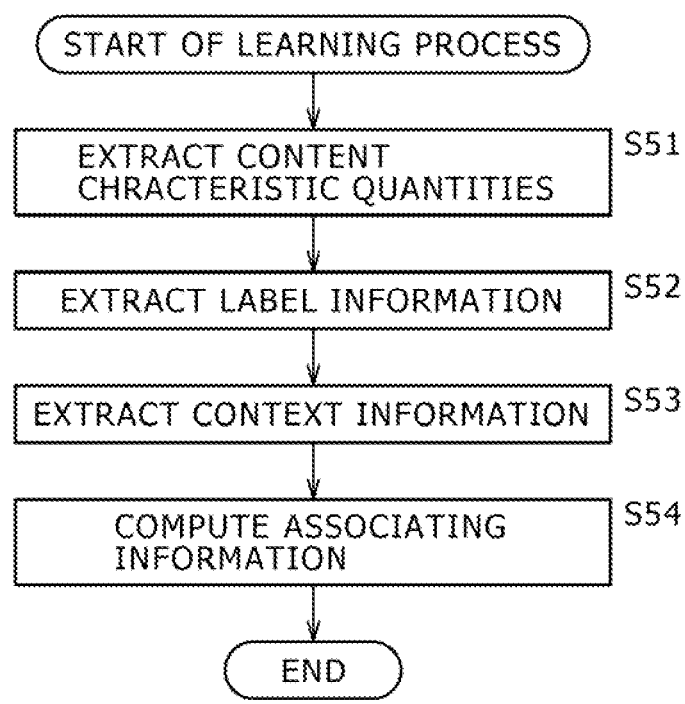
FIG. 19 shows a flowchart to be referred to in explanation of a learning process carried out by the content providing apparatus shown in FIG. 18.

Let us refer back to the flowchart shown in FIG. 19. At a step S54, on the basis of content characteristic quantities stored in the content characteristic quantity storage unit 53, label information stored in the label information storage unit 55 or the context information stored in the context information storage unit 112, the associating information computation unit 56 carries out processing to find associating information for the content characteristic quantities, the label information and the context information. The associating information computation unit 56 stores results obtained from the processing to find associating information for the content characteristic quantities, associating information for the label information and associating information for the context information in the content characteristic quantity—latent space associating information storage unit 57, the label information—latent space associating information storage unit 58 and the context information—latent space association information storage unit 113 respectively as results of the processing. Then, the learning process is finally ended.

In this case, the latent-space expression for content characteristic quantities, label information or context information can be computed in the same way as a relation described above as the relation between content characteristic quantities and label information by making use separate distribution relations for the content characteristic quantities and the label information while having common latent variables $z_k$ and adopting the same method as the method described earlier, that is, the same method as the processing carried out at the step S13 shown in FIG. 3.

That is to say, the associating information computation unit 56 computes associating information for content characteristic quantities, labels and contexts in the same way as the processing carried out at the step S13 shown in FIG. 3.

To put it concretely, context information is stored (or saved) in advance as information indicating how many times each musical content has been listened to in the morning, daytime and night time bands and how many times every musical content has been listened to in the music listening areas of the home, the outdoors and the commuting like the typical context information shown in FIG. 20. Then, the associating information computation unit 56 computes associating information on the basis of the content characteristic quantities shown in FIG. 4, the label information shown in FIG. 5 and the context information shown in FIG. 20.

FIG. 21 is a diagram showing a typical expression based on a latent space as an expression for context information.

In a typical table shown in FIG. 21, the first column and the first row each show items. The items shown on the first column are each a context. On the other hand, the items shown on the first row are 2 latent variables, i.e., latent variables z1 and z2 for each of the contexts shown on the first column.

As shown on the second column of a table given in FIG. 21, the associating information computation unit 56 gives a typical conditional-probability value (for the latent variable z1) of 0.8 as a result of computation for the morning time band on the second row, a typical conditional-probability value (for the latent variable z1) of 0.7 as a result of computation for the daytime time band on the third row, a typical conditional-probability value (for the latent variable z1) of 0.23 as a result of computation for the night time band on the fourth row, a typical conditional-probability value (for the latent variable z1) of 0.3 as a result of computation for the home content-listening area on the fifth row, a typical conditional-probability value (for the latent variable z1) of 0.45 as a result of computation for the outdoor content-listening area on the sixth row and a typical conditional-probability value (for the latent variable z1) of 0.9 as a result of computation for the working-place content-listening area on the seventh row.

That is to say, each of the morning, daytime, night, home, outdoor and commuting contexts is associated with contents or labels by making use of values of the latent variable z1.

By the same token, as shown on the third column of a table given in FIG. 21, the associating information computation unit 56 gives a typical conditional-probability value (for the latent variable z2) of 0.2 as a result of computation for the morning time band on the second row, a typical conditional-probability value (for the latent variable z2) of 0.3 as a result of computation for the daytime time band on the third row, a typical conditional-probability value (for the latent variable z2) of 0.77 as a result of computation for the night time band on the fourth row, a typical conditional-probability value (for the latent variable z2) of 0.7 as a result of computation for the home content-listening area on the fifth row, a typical conditional-probability value (for the latent variable z2) of 0.55 as a result of computation for the outdoor content-listening area on the sixth row and a typical conditional-probability value (for the latent variable z2) of 0.2 as a result of computation for the commuting content-listening area on the seventh row.

That is to say, each of the morning, daytime, night, home, outdoor and commuting contexts is associated with contents or labels by making use of values of the latent variable z2.

In this way, in accordance with the present invention, for each of musical contents such as contents 1 to 10, information on the number of times a content has been listened to in the and morning, daytime and night time bands and in the home, outdoor and working-place content-listening areas is stored in advance as context information so that, as described above, the context information can be combined with content characteristic quantities and/or label information. Then, by combining the context information, content characteristic quantities and label information, it is possible to generate a latent space reflecting the trends of the distributions of the context information, content characteristic quantities and label information and the contexts are mapped onto the latent space as shown in FIG. 21.

Thus, at the operation phase, in the same way as the flowchart shown in FIG. 16, when the user enters a command stating: "A musical content to be listened to in the morning at home," for example, the content providing apparatus 1 selects a musical content close to the morning context and the home context.

It is to be noted that processing to compute a divergence between a context and a content and processing to compute a divergence between a context and a label can be carried out in the same way as the step S42 shown in FIG. 16.

In addition, depending on the user, context information for a content can be context information related to a user or context information related to a plurality of users.

By referring to FIGS. 22 to 25, the following description explains association of favorite information with label information and content characteristic quantities.

Figure 22:
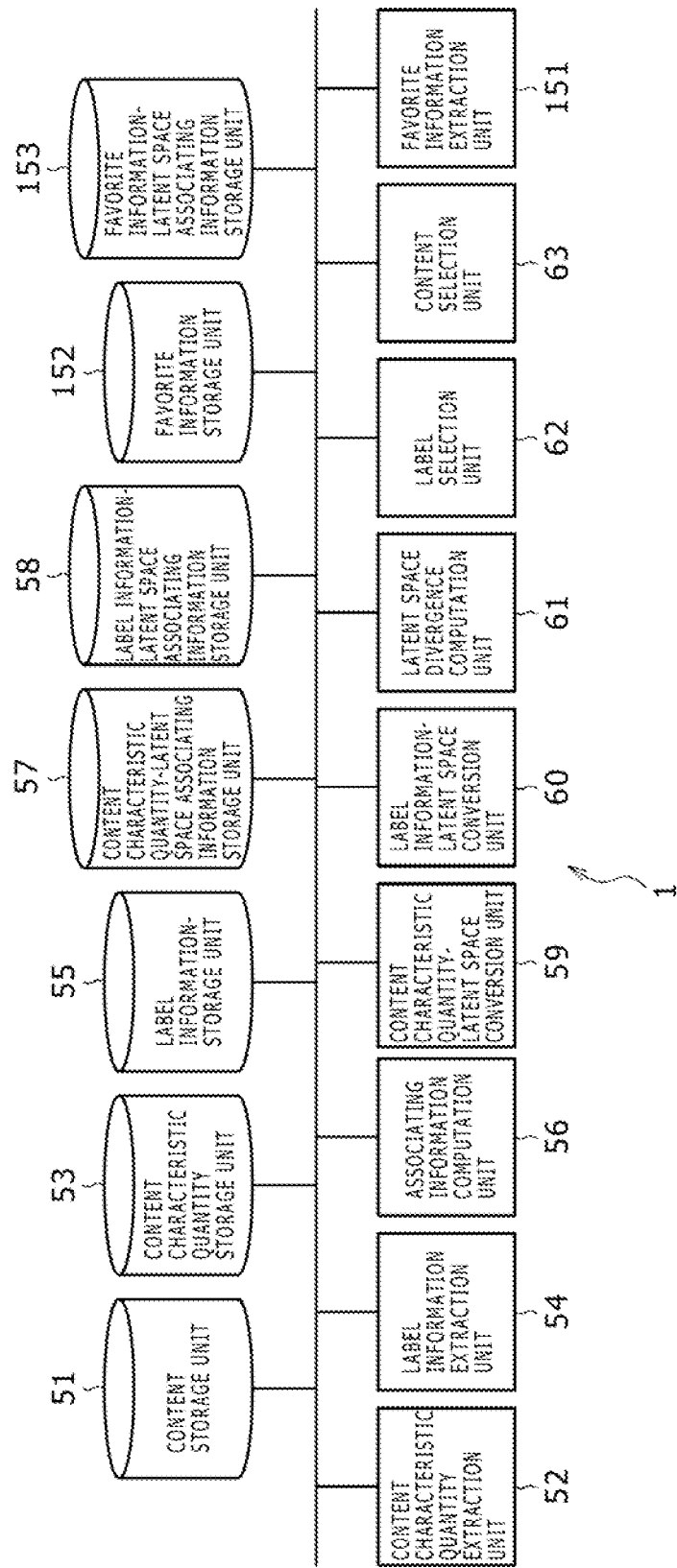
FIG. 22 is a functional block diagram showing a further typical functional configuration of the content providing apparatus.

FIG. 22 is a functional block diagram showing a further typical functional configuration of the content providing apparatus 1.

It is to be noted that configuration elements placed at the same positions in the configuration shown in FIG. 22 as their counterparts shown in FIG. 2 and denoted by the same reference numerals as the counterparts are not explained again in order to avoid duplications of explanation. The content providing apparatus 1 shown in FIG. 22 is obtained by adding a favorite information extraction unit 151, a favorite information storage unit 152 and favorite information—latent space association information storage unit 153 to the configuration shown in the block diagram of FIG. 2.

The favorite information extraction unit 151 extracts favorite information, which is information related to favorite contents stored in the content storage unit 51. The favorite information extraction unit 151 stores (or saves) the extracted favorite information in the favorite information storage unit 152.

The favorite information of a content is defined as information on the content serving as a favorite with the user. An example of the favorite information of a content is information showing evaluations given by users to the content. That is to say, the favorite information of a content is a kind of evaluation information evaluating the content in this case.

The associating information computation unit 56 computes information associating content characteristic quantities stored in the content characteristic quantity storage unit 53 with label information stored in the label information storage unit 55. The associating information computation unit 56 stores (or saves) the associating information computed for the content characteristic quantities in the content characteristic quantity—latent space associating information storage unit 57 and the associating information computed for the label information in the label information—latent space associating information storage unit 58.

In addition, the associating information computation unit 56 computes information associating favorite information stored in the favorite information storage unit 152 with label information stored in the label information storage unit 55. The associating information computation unit 56 stores (or saves) the associating information computed for the label information in the label information—latent space associating information storage unit 58 and the associating information computed for the favorite information in the favorite information—latent space association information storage unit 153.

On top of that, the associating information computation unit 56 computes information associating content characteristic quantities stored in the content characteristic quantity storage unit 53 with favorite information stored in the favorite information storage unit 152. The associating information computation unit 56 stores (or saves) the associating information computed for the content characteristic quantities in the content characteristic quantity—latent space associating information storage unit 57 and the associating information computed for the favorite information in the favorite information—latent space association information storage unit 153.

It is to be noted that, in this case, the associating information associates contents, labels and favorite contents with each other. That is to say, the associating information links contents, labels and favorite contents with each other by making use of latent variables $z_k$.

In the embodiment described above, the content characteristic quantity—latent space associating information storage unit 57, the label information—latent space associating information storage unit 58 and the favorite information—latent space association information storage unit 153 are separated from each other. It is to be noted, however, that the units can also be integrated into a single unit. In this case, the single unit obtained as a result of integrating the content characteristic quantity—latent space associating information storage unit 57, the label information—latent space associating information storage unit 58 and the favorite information—latent space association information storage unit 153 is used for storing all pieces of associating information.

Next, a learning process carried out by the content providing apparatus 1 shown in FIG. 22 is explained by referring to a flowchart shown in FIG. 23 as follows.

Processes carried out at steps S61 and S62 are respectively identical with processes carried out at steps S11 and S12 shown in FIG. 3. Thus, explanation of the steps S61 and S62 is omitted.

At a step S63, the favorite information extraction unit 151 extracts favorite information related to contents stored in the content storage unit 51 and stores (or saves) the extracted favorite information in the favorite information storage unit 152. For example, the favorite information extracted by the favorite information extraction unit 151 at the step S63 as favorite information related to a musical content stored in the content storage unit 51 is the aforementioned evaluation information showing evaluations given by users such as users 1, 2, 3, 4 and 5 to the musical content. The favorite information extraction unit 151 stores the extracted evaluation information in the favorite information storage unit 152 as favorite information.

To put it concretely, let us assume for example that musical contents stored in the content storage unit 51 are contents 1 to 10. In this case, the favorite information extraction unit 151 extracts favorite information like typical one shown in FIG. 24.

FIG. 24 is a diagram showing typical favorite information for musical contents.

In a typical table shown in FIG. 24, the first column and the first row each show items. The items shown on the first column are each the name of a musical content stored in the content storage unit 51. On the other hand, the items shown on the first row are each a user giving an evaluation to the musical contents shown on the first column. In this typical favorite information, the users are user 1, user 2, user 3, user 4 and user 5 giving evaluations of five grades to the musical contents as favorite information. In the table shown in FIG. 24, for example, an evaluation grade of 1 given to a musical content indicates that the musical content is boring. On the other hand, an evaluation grade of 5 given to a musical content indicates that the musical content is enjoyable.

As shown on the second row of FIG. 24, the favorite information extraction unit 151 extracts favorite information indicating that user 1, user 2, user 3, user 4 and user 5 have given evaluation grades of 3, 4, 2, 2 and 4 respectively as typical evaluations to content 1. In the same way, as shown on the third row of FIG. 24, the favorite information extraction unit 151 extracts favorite information indicating that user 1, user 2, user 3, user 4 and user 5 have given evaluation grades of 5, 4, 2, 3 and 3 respectively as typical evaluations to content 2. By the same token, as shown on the fourth row of FIG. 24, the favorite information extraction unit 151 extracts favorite information indicating that user 1, user 2, user 3, user 4 and user 5 have given evaluation grades of 3, 3, 1, 3 and 5 respectively as typical evaluations to content 3. Likewise, as shown on the fifth row of FIG. 24, the favorite information extraction unit 151 extracts favorite information indicating that user 1, user 2, user 3, user 4 and user 5 have given evaluation grades of 4, 3, 2, 2 and 3 respectively as typical evaluations to content 4.

Similarly, as shown on the sixth row of FIG. 24, for example, the favorite information extraction unit 151 extracts favorite information indicating that user 1, user 2, user 3, user 4 and user 5 have given evaluation grades of 4, 2, 3, 2 and 4 respectively as typical evaluations to content 5. By the same token, as shown on the seventh row of FIG. 24, the favorite information extraction unit 151 extracts favorite information indicating that user 1, user 2, user 3, user 4 and user 5 have given evaluation grades of 2, 3, 4, 3 and 2 respectively as typical evaluations to content 6. In the same way, as shown on the eighth row of FIG. 24, the favorite information extraction unit 151 extracts favorite information indicating that user 1, user 2, user 3, user 4 and user 5 have given evaluation grades of 3, 1, 3, 3 and 2 respectively as typical evaluations to content 7.

Likewise, as shown on the ninth row of FIG. 24, for example, the favorite information extraction unit 151 extracts favorite information indicating that user 1, user 2, user 3, user 4 and user 5 have given evaluation grades of 1, 2, 5, 4 and 3 respectively as typical evaluations to content 8. By the same token, as shown on the tenth row of FIG. 24, the favorite information extraction unit 151 extracts favorite information indicating that user 1, user 2, user 3, user 4 and user 5 have given evaluation grades of 2, 2, 4, 5 and 2 respectively as typical evaluations to content 9. In the same way, as shown on the eleventh row of FIG. 24, the favorite information extraction unit 151 extracts favorite information indicating that user 1, user 2, user 3, user 4 and user 5 have given evaluation grades of 1, 2, 3, 4 and 3 respectively as typical evaluations to content 10.

Figure 23:
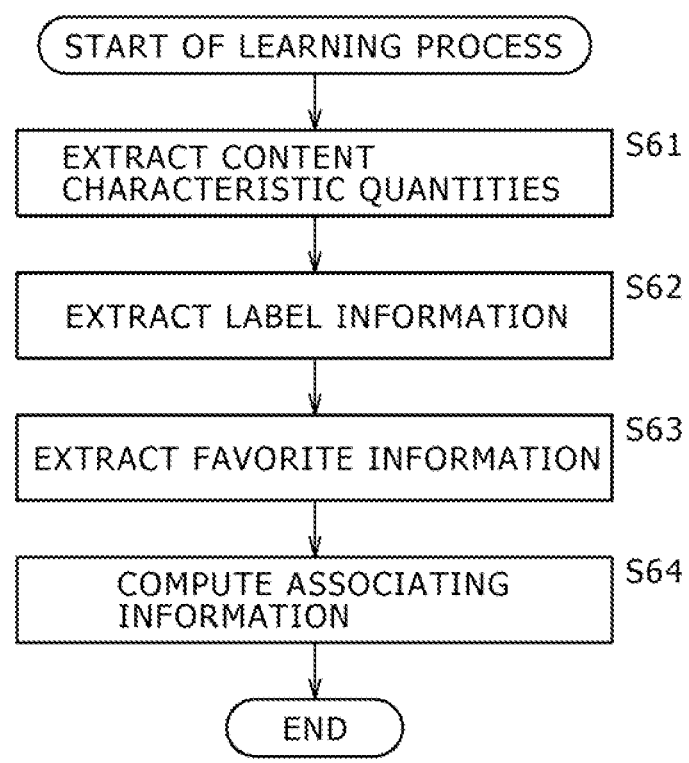
FIG. 23 shows a flowchart to be referred to in explanation of a learning process carried out by the content providing apparatus shown in FIG. 22.

Let us refer back to the flowchart shown in FIG. 23. At a step S64, on the basis of content characteristic quantities stored in the content characteristic quantity storage unit 53, label information stored in the label information storage unit 55 or favorite information stored in favorite information storage unit 152, the associating information computation unit 56 carries out processing to find associating information for the content characteristic quantities, the label information and the favorite information. The associating information computation unit 56 stores results obtained from the processing to find associating information for the content characteristic quantities, associating information for the label information and associating information for the favorite information in the content characteristic quantity—latent space associating information storage unit 571 the label information—latent space associating information storage unit 58 and the favorite information—latent space association information storage unit 153 respectively as results of the processing. Then, the learning process is finally ended.

In this case, the latent-space expression for content characteristic quantities, label information or favorite information can be computed in the same way as a relation described above as the relation between content characteristic quantities and label information by making use separate distribution relations for the content characteristic quantities and the label information while having common latent variables $z_k$ and adopting the same method as the method described earlier, that is, the same method as the processing carried out at the step S13 shown in FIG. 3.

That is to say, the associating information computation unit 56 computes associating information for content characteristic quantities, labels and favorites in the same way as the processing carried out at the step S13 shown in FIG. 3.

To put it concretely, favorite information is stored (or saved) in advance as information indicating evaluations given by users to every musical content like the typical favorite information shown in FIG. 24. Then, the associating information computation unit 56 computes associating information on the basis of the content characteristic quantities shown in FIG. 4, the label information shown in FIG. 5 and the favorite information shown in FIG. 24.

FIG. 25 is a diagram showing a typical expression based on a latent space for favorite information.

In a typical table shown in FIG. 25, the first column and the first row each show items. The items shown on the first column are each the name of favorite information (or the name of a user giving evaluations to musical contents). On the other hand, the items shown on the first row are two latent variables (i.e., latent variables z1 and z2) for the users each shown on the first column as a user giving evaluations to contents.

As shown on the second column of a table given in FIG. 25, the associating information computation unit 56 gives a typical conditional-probability value (for the latent variable z1) of 0.8 as a result of computation for user 1 on the second row, a typical conditional-probability value (for the latent variable z1) of 0.7 as a result of computation for user 2 on the third row, a typical conditional-probability value (for the latent variable z1) of 0.3 as a result of computation for user 3 on the fourth row, a typical conditional-probability value (for the latent variable z1) of 0.45 as a result of computation for user 4 on the fifth row and a typical conditional-probability value (for the latent variable z1) of 0.9 as a result of computation for user 5 on the sixth row.

That is to say, user 1, user 2, user 3, user 4 and user 5, which are each used as the name of favorite information, are associated with contents or labels by making use of values of the latent variable z1.

By the same token, as shown on the third column of a table given in FIG. 25, the associating information computation unit 56 gives a typical conditional-probability value (for the latent variable z2) of 0.2 as a result of computation for user 1 on the second row, a typical conditional-probability value (for the latent variable z2) of 0.3 as a result of computation for user 2 on the third row, a typical conditional-probability value (for the latent variable z2) of 0.7 as a result of computation for user 3 on the fourth row, a typical conditional-probability value (for the latent variable z2) of 0.55 as a result of computation for user 4 on the fifth row and a typical conditional-probability value (for the latent variable z2) of 0.2 as a result of computation for user 5 on the sixth row.

That is to say, user 1, user 2, user 3, user 4 and user 5, which are each used as the name of favorite information, are associated with contents or labels by making use of values of the latent variable z2.

As described above, in accordance with the present invention, five users give evaluations of five grades to musical contents such as contents 1 to 10 as shown in the typical favorite information of FIG. 24. In this case, by combining the favorite information shown in FIG. 24 as information for musical contents and content characteristic quantities shown in FIG. 4 as quantities for the musical contents, it is possible to generate optimum latent variables (that is, latent variables $z_k$) while letting the trends of favorites with the users and the trends of the content characteristic quantities affect each other and place the favorite information like the one shown in FIG. 25 as favorite information of the users in a latent space.

In addition, in accordance with the present invention, by inferring parameters of another distribution while having the latent variables $z_k$ common to content characteristic quantities and label information, for example, it is possible to obtain a latent space reflecting objective trends of contents, their characteristics and labels while also reflecting trends of favorites with users. An example of the characteristic of a content is a word included in a text written by an authorized person as a text reviewing the content.

Thus, at the operation phase, by making use of expressions based on a latent space as expressions of favorite information for users and contents, for example, it is possible to carry out clustering of users as clustering flavored with information on favorites with all users, clustering of contents and, in addition, simultaneous clustering of users and contents.

In this way, in accordance with the present invention, it is possible to recommend a content that can serve as a favorite with a user to the user.

In the embodiment described above, evaluation information is given by five users. It is to be noted, however, that the number of users giving evaluations is by no means limited to five. That is to say, any number of users can give evaluations. For example, it is possible to provide a configuration in which a latent space (latent variables $z_k$) are computed by regarding evaluation information given by one user as a one-dimensional space.

By the way, in the case of the present invention, it is also possible to define a feature characteristic in processed information as a characteristic allowing mapping the information onto the latent space described before. The processed information can be the content characteristic quantities, the label information, the context information or the favorite information. To put it concretely, by using Eq. (14) to define how a feature characteristic expressed as a probability distribution in a latent space can be monotonously decreased with respect to its entropy, for example, the feature characteristic can be computed.

[Eq. 14]

$$c(w_i) = 1 - H(w_i) \quad (14)$$
$$= 1 + \sum_k p(z_k \mid w_i) \log p(z_k \mid w_i)$$

That is to say, for example, the associating information computation unit 56 defines context information like the one shown in FIG. 20 as context information related to musical contents by making use of Eq. (14) in order to obtain a feature characteristic like one shown in FIG. 26 as a feature characteristic of a context.

FIG. 26 is a diagram showing a typical feature characteristic of a context.

The first column of a typical table given in FIG. 26 shows a context while the second column shows values of the feature characteristic of the context.

As shown in FIG. 26, as results of computation, the associating information computation unit 56 produces a typical feature-characteristic value of 0.500 for the morning context item on the second row, a typical feature-characteristic value of 0.389 for the daytime context item on the third row, a typical feature-characteristic value of 0.461 for the night context item on the fourth row, a typical feature-characteristic value of 0.389 for the home context item on the fifth row, a typical feature-characteristic value of 0.311 for the outdoor context item on the sixth row and a typical feature-characteristic value of 0.675 for the working-place context item on the seventh row.

That is to say, as is obvious from the six typical feature-characteristic values shown in FIG. 26, the commuting context item having a feature-characteristic value of 0.675 and the morning context item having a feature-characteristic value of 0.500 are the feature characteristics of the six context items shown in the typical context information shown in FIG. 20 as context information for musical contents. In the case of context information, the feature characteristics are context items having largest feature-characteristic values among all the context items. These feature characteristics for a musical content indicate that the outdoor context item does not have an effect on the way to listen to the musical content. Thus, when the user is present at an outdoor location, metadata or context information for another musical content can be recommended to the user. As an alternative, since the commuting context item has a large feature-characteristic value, the other context items are ignored and a musical content having a divergence close to only the commuting context item serving as context information in the latent space can be recommended.

The feature-characteristic concept can also be applied to the label information as well. In the case of label information, the feature characteristics are labels having largest feature-characteristic values among all labels. A label having a largest feature-characteristic value can be said to be a label having a deepest relation with the content characteristic quantities of a musical content or a characteristic label. Thus, for example, such a label can be selected and displayed as highlighted label information among sentences such as a text reviewing the musical content in order help the user reading the sentences better understand the musical content.

First of all, processing to associate a label with a content is explained by referring to FIGS. 27 to 30. This processing is also referred to as a learning process. The explanation of the learning process is followed by description of an operation phase with reference to FIGS. 31 to 35. The operation phase is processing to select label information having a large feature-characteristic value by making use of a relation between label information and content characteristic quantities associated with the label information and display the selected label information as highlighted label information.

Figure 27:
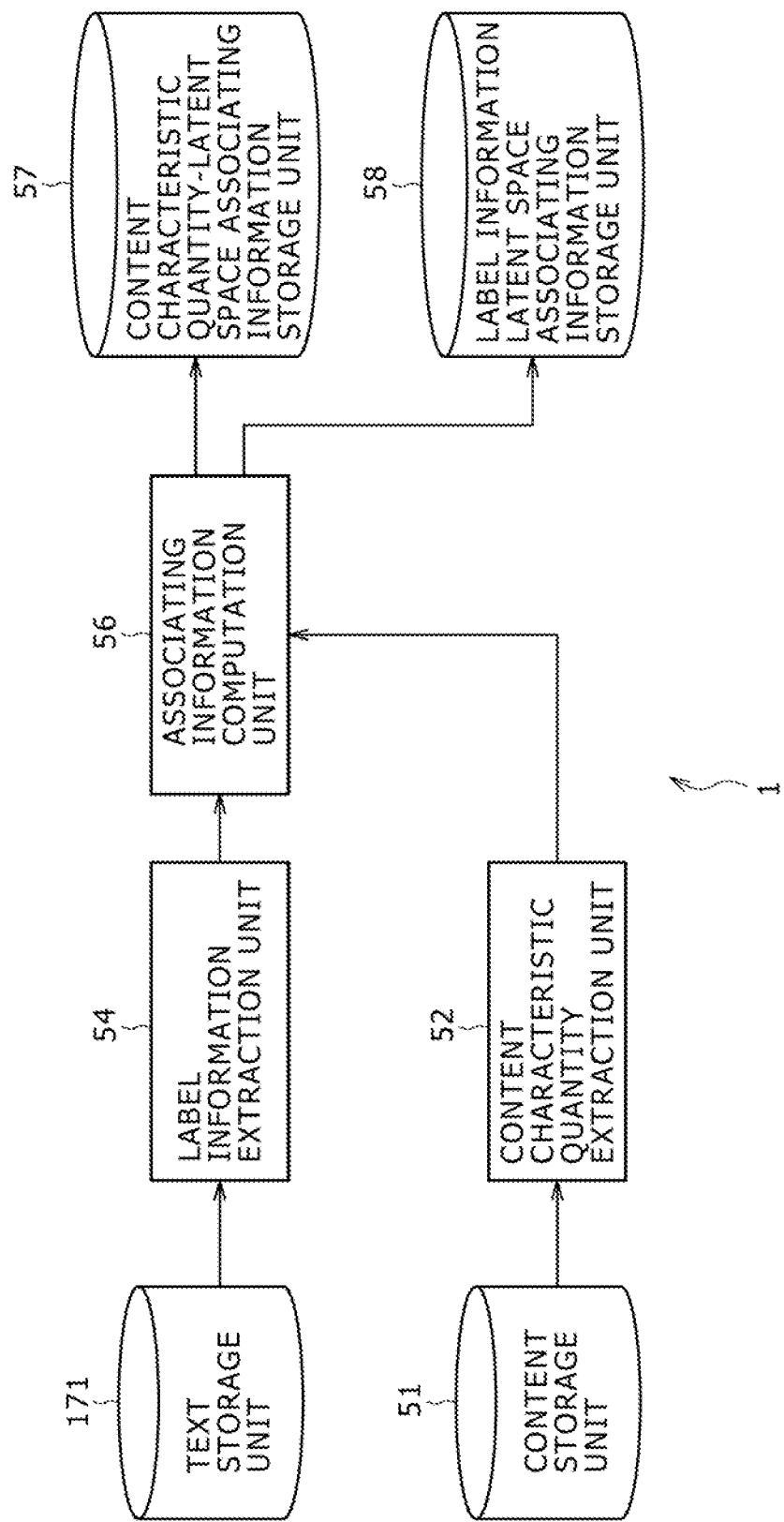
FIG. 27 is a functional block diagram showing a still further typical functional configuration of the content providing apparatus.

FIG. 27 is a functional block diagram showing a still further typical functional configuration of the content providing apparatus.

It is to be noted that configuration elements placed at the same positions in the configuration shown in FIG. 27 their counterparts shown in FIG. 2, used to carry out the same processing as the counterparts and denoted by the same reference numerals as the counterparts are not explained again in order to avoid duplications of explanation. In the configuration of the content providing apparatus 1 shown in FIG. 27, a text storage unit 171 is connected to the label information extraction unit 54 while the content characteristic quantity storage unit 53, the label information storage unit 55, the content characteristic quantity—latent space conversion unit 59, the label information—latent space conversion unit 60, the latent space divergence computation unit 61, the label selection unit 62 and the content selection unit 63, which are shown in the block diagram of FIG. 2, are omitted from the configuration.

The text storage unit 171 is a unit for storing (or saving) textual information. The textual information stored in the text storage unit 171 is information expressed in terms of sentences written in a natural language. The textual information is a text regarding a content stored in the content storage unit 51. Examples of the textual information are a text reviewing such a content and a text describing an impression on the content. The text storage unit 171 supplies textual information to the label information extraction unit 54 at a request made by the label information extraction unit 54.

The label information extraction unit 54 disassembles the textual information received from the text storage unit 171 by splitting the information into words or phrases each used as a unit revealing a meaning to the user by carrying out a morpheme analysis or the like. The label information extraction unit 54 supplies information obtained as a result of the morpheme analysis to the associating information computation unit 56 as label information. The information obtained as a result of the morpheme analysis is morphemes.

It is to be noted that, handled as a unit revealing a meaning to the user, a phrase is a word or a string of words.

In addition, as will be described later in detail, the morpheme analysis is one of basic technologies of the so-called natural language processing carried out by making use of a computer or the like. The morpheme analysis is a work of distinguishing word classes used in a sentence written in a natural language from each other by splitting the sentence into a string of morphemes, which are each, roughly speaking, a smallest unit revealing a meaning in the language. It is to be noted that, in general, the morpheme analysis is carried out by making use of apparatus including a morpheme analyzer such as the "ChaSen" for splitting a sentence written in the Japanese language into morphemes and the so-called chunker such as the "YamCha" for recognizing a morpheme as a meaningful string of words. The "ChaSen" is an analyzer developed by the Matsumoto Laboratory of the Nara Graduate University of Advanced Science and Technologies. In the case of an English sentence or the like, a process referred to as lemmatization is carried out to fetch the basic form of every word used in the sentence. In the lemmatization process, a change observed at the tail of every word is discarded from the word and only the basic form of the word is left. A change observed at the tail of a word is a change to indicate, among others, a plurality or a singularity of a noun or indicate a past time or present time of an occurrence.

The associating information computation unit 56 computes information associating content characteristic quantities supplied by the content characteristic quantity extraction unit 52 with label information supplied by the label information extraction unit 54. The associating information computation unit 56 stores the associating information computed for the content characteristic quantities in the content characteristic quantity—latent space associating information storage unit 57 and the associating information computed for the label information in the label information—latent space associating information storage unit 58.

It is to be noted that the content characteristic quantities extracted by the content characteristic quantity extraction unit 52 can also be stored in the content characteristic quantity storage unit 53 in advance while the label information extracted by the label information extraction unit 54 is stored in the label information storage unit 55 in advance in the same way as the embodiments described earlier. In this case, the associating information computation unit 56 reads out the content characteristic quantities from the content characteristic quantity storage unit 53 and the label information from the label information storage unit 55, computing the associating information. In order to make the explanation simple, however, the operations making use of the content characteristic quantity storage unit and the label information storage unit 55 are not explicitly indicated in FIG. 27.

Figure 28:
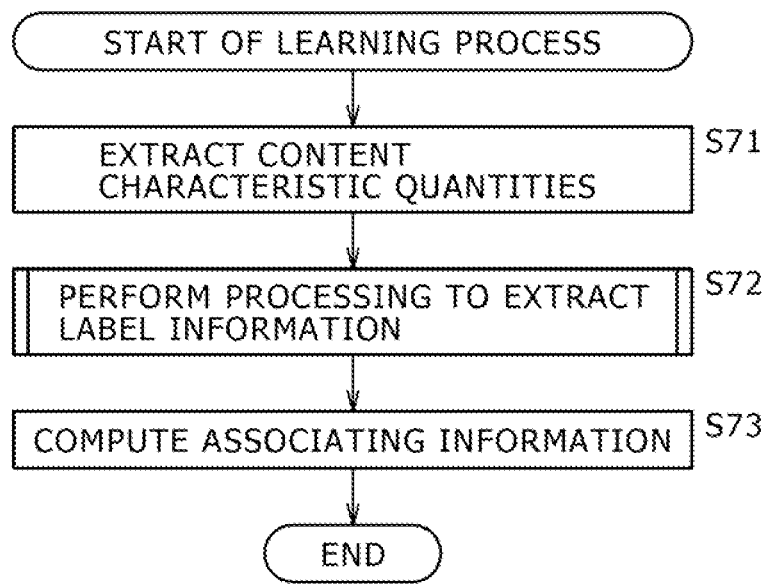
FIG. 28 shows a flowchart to be referred to in explanation of a learning process carried out by the content providing apparatus shown in FIG. 27.

A learning process carried out by the content providing apparatus 1 shown in FIG. 27 is explained by referring to a flowchart shown in FIG. 28 as follows.

A process carried out at a step S71 is identical with the process carried out at the step S11 shown in FIG. 3. Thus, explanation of the step S71 is omitted.

At a step S72, the label information extraction unit 54 carries out label-information extraction processing to extract label information from textual information stored in the text storage unit 171.

Details of the label-information extraction processing carried out by the label information extraction unit 54 at the step S72 are explained by referring to a flowchart shown in FIG. 29 as follows.

At a step S81, the label information extraction unit 54 reads out textual information from the text storage unit 171.

At a step S82, the label information extraction unit 54 carries out a morpheme analysis on the textual information read out from the text storage unit 171.

FIG. 30 is a diagram showing a typical morpheme analysis carried out by the label information extraction unit 54.

In the typical morpheme analysis shown in FIG. 30, textual information of " . . . hitasura akarui norinori no kyoku ga . . . " shown in the upper part of the figure has been stored in the text storage unit 171. In this case, the label information extraction unit 54 carries out a morpheme analysis on the textual information of " . . . hitasura akarui norinori no kyoku ga . . . " and obtains a morpheme analysis result shown in the lower part of the figure.

The morpheme analysis result shown in the lower part of FIG. 30 is divided into six columns. The first column from the left shows a string of characters whereas the second column shows the pronunciation of the character string. The third column shows the basic form of the character string whereas the fourth column shows the word-class name of the character string. The fifth column shows the utilization type of the character string whereas the sixth column shows the utilization form of the character string.

That is to say, as a result of the morpheme analysis carried out by the label information extraction unit 54, in the case of the textual information of " . . . hitasura akarui norinori no kyoku ga . . . " displayed in the upper part of FIG. 30, as shown in the lower part of the figure, for the character string of "hitasura", the pronunciation is "hitasura", the basic form is "hitasura" and the word-class name is an adverb-general. For the character string of "akarui", the pronunciation is "akarui", the basic form is "akarui", the word-class name is an adjective-independent, the utilization type is an adjective-vowel stage and the utilization form is the basic form. For the character string of "norinori", the pronunciation is "norinori", the basic form is "norinori" and the word-class name is a noun-adjective/verb base.

By the same token, in the case of the textual information of " . . . hitasura akarui norinori no kyoku ga . . . " displayed in the upper part of FIG. 30, as shown in the lower part of the figure, for the character string of "no", the pronunciation is "no", the basic form is "no" and the word-class name is a particle-adnominal clause. For the character string of "kyoku", the pronunciation is "kyoku", the basic form is "kyoku" and the word-class name is a noun-general.

For the character string of "ga", the pronunciation is "ga", the basic form is "ga" and the word-class name is a particle-case particle-general.

It is to be noted that the label information extraction unit 54 can also delete an insignificant word from the textual information in accordance with a list defined in advance. An insignificant word is a word considered to be a word of obviously no importance to the morpheme analysis. Examples of the insignificant word are the character string of "no" and the character string of "ga", which are shown in the lower part of FIG. 30 and included on the list in advance.

Figure 29:
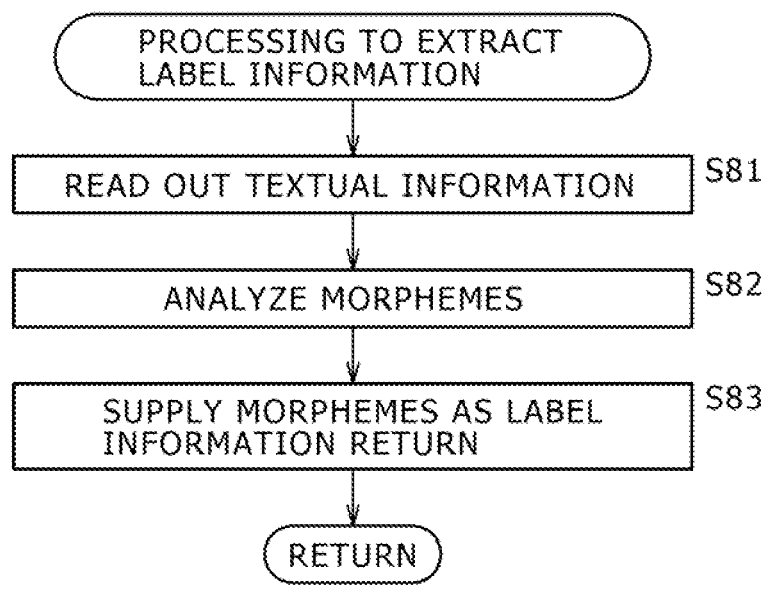
FIG. 29 shows a flowchart to be referred to in explanation of details of processing to compute label information.

Let us refer back to the flowchart shown in FIG. 29. At a step S83, the label information extraction unit 54 supplies the morphemes resulting from the morpheme analysis to the associating information computation unit 56 as label information. Then, the label information extraction unit 54 finally ends the processing to extract label information. The flow of the processing returns to the step S72 shown in FIG. 28 in order to continue the learning process from a step S73.

To put it concretely, the label information extraction unit 54 takes the basic form of each character string as a morpheme. In the case of the typical morpheme analysis result shown in the lower part of FIG. 30, the basic form of each of the character strings is shown on the third column from the left side. In the case of this typical morpheme analysis result, the character strings are the character strings of "hitasura", "akarui", "norinori", "kyoku" and so on. The basic form of a character string is the original form prior to the normal use of the string. Then, the label information extraction unit 54 supplies the morphemes of "hitasura", "akarui", "norinori" and "kyoku" to the associating information computation unit 56.

At the step S73, much like the process carried out at the step S13 shown in FIG. 3, the associating information computation unit 56 carries out processing to find associating information for content characteristic quantities and associating information for label information. The associating information computation unit 56 stores associating information found for the content characteristic quantities and associating information found for the label information in the content characteristic quantity—latent space associating information storage unit 57 and the label information—latent space associating information storage unit 58 respectively as results of the processing. Then, the learning process is finally ended.

For example, on the basis of content characteristic quantities and label information, the associating information computation unit 56 computes average vectors $\mu_k$, variance—covariance matrixes $S_k$, pre-probability values $\alpha_k$ and conditional probabilities $p(w_i|z_k)$ as associating information for latent variables $z_k$. Then, the associating information computation unit 56 typically stores the average vectors $\mu_k$, the variance—covariance matrixes $S_k$ and the pre-probability values $\alpha_k$ in the content characteristic quantity—latent space associating information storage unit 57 as associating information for the latent variables $z_k$ and typically stores the conditional probabilities $p(w_i|z_k)$ and the pre-probability values $\alpha_k$ in the label information—latent space associating information storage unit 58 as associating information for combinations of the latent variables $z_k$ and the labels $w_i$.

As described above, by carrying out the learning process, the content providing apparatus 1 stores the associating information found for the content characteristic quantities in the content characteristic quantity—latent space associating information storage unit 57 and the associating information found for the label information in the label information—latent space associating information storage unit 58.

In this way, by making use of a phrase included in a text written in a natural language as textual information, the user is capable of giving an attribute (or a phrase) to a content by merely describing a sentence without the need to recognize the characteristic of the content. In addition, since the relation between the content characteristic quantity and the phrase is computed, the relation between them can be used to reduce the cost of assigning metadata to the content.

By referring to FIGS. 31 to 35, the following description explains processing to select specific label information by making use of a relation between content characteristic quantities and label information and display the selected label information as a highlighted display item. As described above, the content characteristic quantities and the label information are associated with each other in the learning process. The specific label information is label information having a good feature characteristic representing the degree of relationship between phrases and content characteristic quantities.

Figure 31:
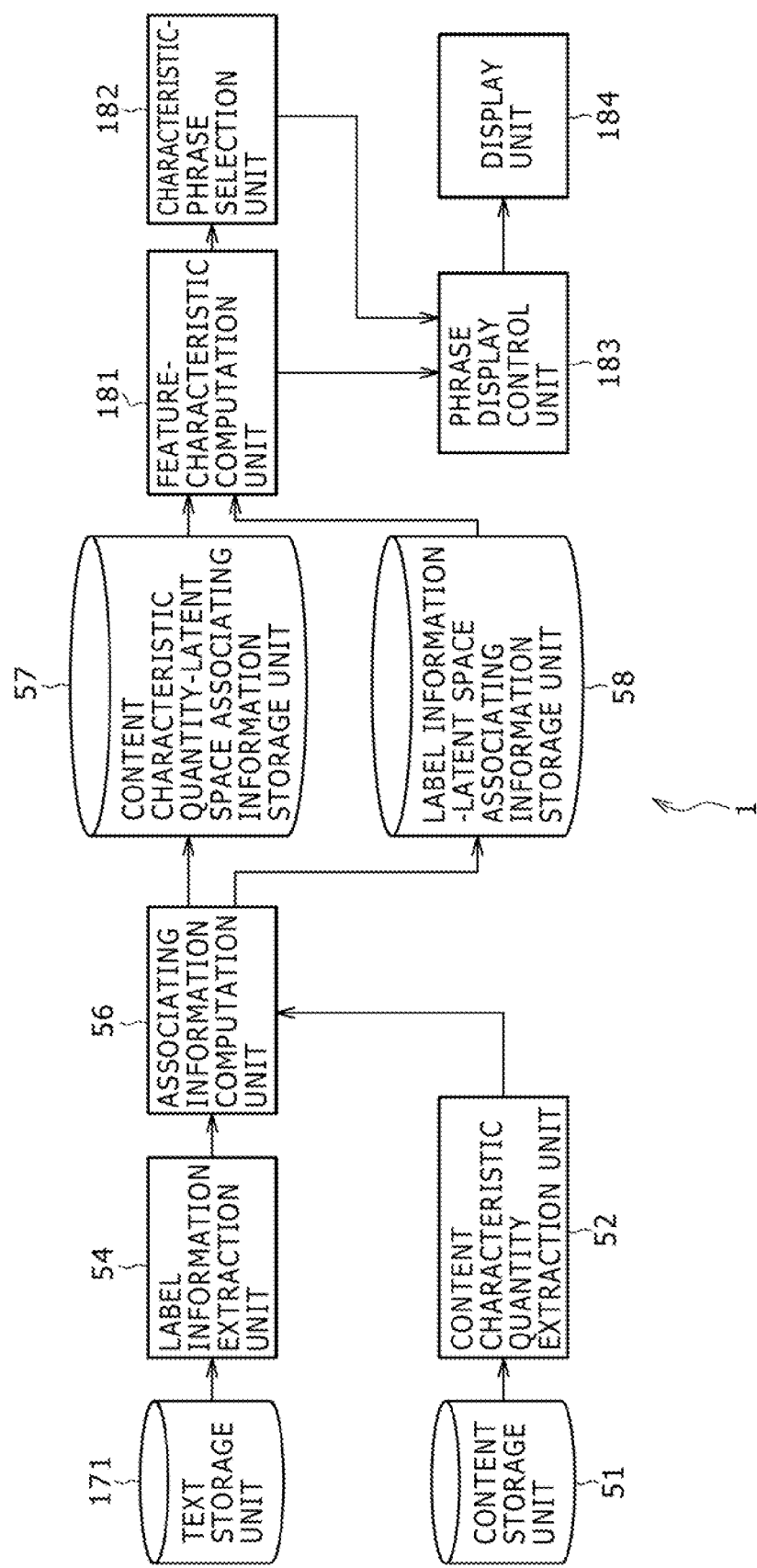
FIG. 31 is a functional block diagram showing a still further typical functional configuration of the content providing apparatus.

FIG. 31 is a functional block diagram showing a still further typical functional configuration of the content providing apparatus 1.

It is to be noted that configuration elements placed at the same positions in the configuration shown in FIG. 31 as their counterparts shown in FIG. 27, used to carry out the same processing as the counterparts and denoted by the same reference numerals as the counterparts are not explained again in order to avoid duplications of explanation. The configuration of the content providing apparatus 1 shown in FIG. 31 is obtained by adding a feature-characteristic computation unit 181, a characteristic-phrase selection unit 182, a phrase display control unit 183 and a display unit 184 to the configuration shown in the block diagram of FIG. 27.

The feature-characteristic computation unit 181 acquires associating information for phrases obtained as a result of a process to disassemble textual information from the content characteristic quantity—latent space associating information storage unit 57 and the label information—latent space associating information storage unit 58.

On the basis of the acquired associating information for phrases, the feature-characteristic computation unit 181 then computes feature characteristics, which represent the degree of relationship between phrases and content characteristic quantities, in accordance with Eq. (14). Then, the feature-characteristic computation unit 181 supplies the computed feature characteristics and phrases associated with the feature characteristics to the characteristic-phrase selection unit 182. The feature-characteristic computation unit 181 also supplies the phrases obtained as a result of a process to disassemble textual information to the phrase display control unit 183.

On the basis of the values of the feature characteristics received from the feature-characteristic computation unit 181, the characteristic-phrase selection unit 182 selects characteristic phrases from the phrases associated with the feature characteristics. A characteristic phrase is a phrase having a relatively large feature characteristic value. Then, the characteristic-phrase selection unit 182 supplies the selected characteristic phrases to the phrase display control unit 183.

It is to be noted that, in accordance with a method adopted by the characteristic-phrase selection unit 182 to select characteristic phrases, phrases each having a feature characteristic value greater than a threshold value determined in advance are each selected as a characteristic phrase. In accordance with another method adopted by the characteristic-phrase selection unit 182 to select characteristic phrases, the phrases received from the feature-characteristic computation unit 181 are sorted in an order of decreasing feature characteristic values and, the top 10% of the phrases are then selected.

The phrase display control unit 183 compares the selected characteristic phrases received from the characteristic-phrase selection unit 182 with the phrases received from the feature-characteristic computation unit 181 as phrases obtained as a result of a process to disassemble textual information. Then, the phrase display control unit 183 displays only phrases received from the feature-characteristic computation unit 181 as phrases each matching one or the characteristic phrases on the display unit 184 as highlighted display items.

The display unit 184 corresponds to the output unit 17 shown in FIG. 1. The display unit 184 typically displays sentences serving as textual information in accordance with control executed by the phrase display control unit 183.

By referring to a flowchart shown in FIG. 32, the following description explains processing carried out by the content providing apparatus 1 shown in FIG. 31 as processing to display phrases as follows.

At a step S91, on the basis of associating information for phrases cut out from textual information, the feature-characteristic computation unit 181 computes feature characteristics for the phrases in accordance with Eq. (14).

It is to be noted that, in the following description, conditional probabilities p (z=z1|z1) and p (z=z1|z1) serving as probability-distribution parameters (or associating information) have been computed for every phrase and each of the latent variables z1 and z2 respectively as shown in a table of FIG. 33. In the table, the phrases are the label words wi "hitasura", "akarui", "norinori" and "kyoku", which are cut out from the textual information of " . . . hitasura akarui norinori no kyoku ga . . . " shown in the upper part of FIG. 30 except the label words $w_i$ "no" and "ga", which are each a particle. The computed conditional probabilities p (z=z$_1$|w$_i$) and p (z=z$_2$|w$_i$) have been stored in the label information— latent space associating information storage unit 58.

Figures 32, 33:
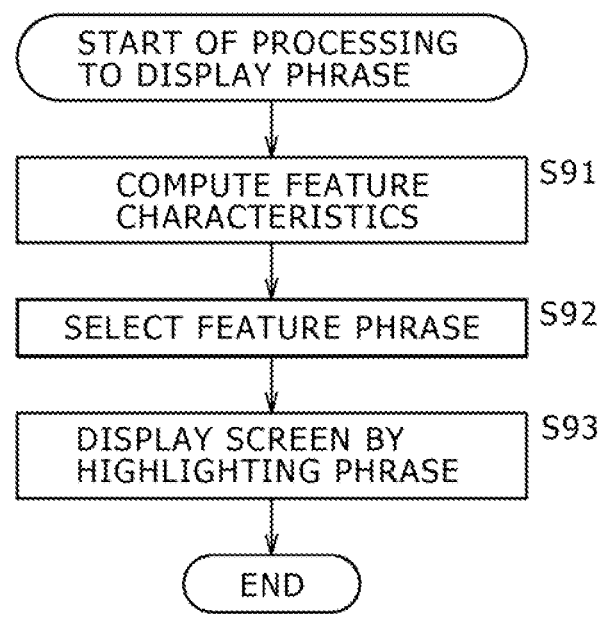
FIG. 32 shows a flowchart to be referred to in explanation of a learning process carried out by the content providing apparatus shown in FIG. 31.
FIG. 33 is a diagram showing an expression based on a latent space as a typical expression for labels.

FIG. 33 is a diagram showing an expression based on a latent space as a typical expression for phrases (or labels $w_i$). That is to say, the figure shows the latent space as a typical expression for phrases, that is, typical values of the conditional probability p ($z_k$|wi).

In the typical table shown in FIG. 33, the first column and the first row each show items. The items shown on the first column are each a phrase cut out from textual information such as a text reviewing a content. The textual information is information extracted by the label information extraction unit 54. On the other hand, the items shown on the first row are two latent variables, i.e., latent variables z1 and z2.

As shown on the second column of a table given in FIG. 33, in the label information—latent space associating information storage unit 58, there have been stored a typical conditional-probability value (for the latent variable z1) of 0.4 as a result of computation for the label word of "hitasura" on the second row, a typical conditional-probability value (for the latent variable z1) of 0.8 as a result of computation for the label word of "akarui" on the third row, a typical conditional-probability value (for the latent variable z1) of 0.7 as a result of computation for the label word of "norinori" on the fourth row, a typical conditional-probability value (for the latent variable z1) of 0.5 as a result of computation for the label word of "kyoku" on the fifth row and so on.

That is to say, each of the phrases of "hitasura", "akarui", "norinori", "kyoku" and so on is associated with musical contents by making use of values of the latent variable z1.

By the same token, as shown in FIG. 33, in the label information—latent space associating information storage unit 58, there have been stored a typical conditional-probability value (for the latent variable z2) of 0.6 as a result of computation for the label word of "hitasura" on the second row, a typical conditional-probability value (for the latent variable z2) of 0.2 as a result of computation for the label word of "akarui" on the third row, a typical conditional-probability value (for the latent variable z2) of 0.3 as a result of computation for the label word of "norinori" on the fourth row, a typical conditional-probability value (for the latent variable z2) of 0.5 as a result of computation for the label word of "kyoku" on the fifth row and so on.

That is to say, each of the phrases of "hitasura", "akarui", "norinori", "kyoku" and so on is associated with musical contents by making use of values of the latent variable z2.

In addition, as shown in FIG. 33, for example, the phrases of "akarui" and "norinori" each having a close relation with the data of the musical content each have a large value of the conditional probability p ($z_k$|w$_i$) for the latent variable z1 or z2.

Figures 34, 35:
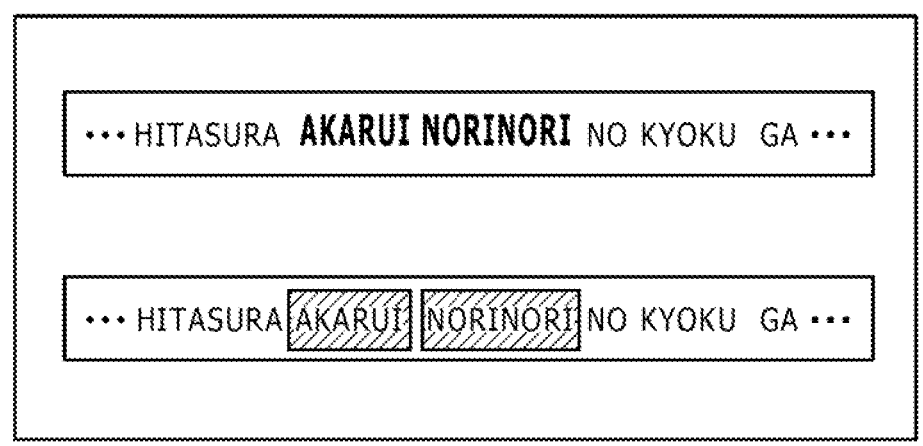
FIG. 34 is a diagram showing a typical feature characteristic of each phrase.
FIG. 35 is a diagram showing a display unit exhibiting a typical display of sentences such as a sentence reviewing a musical content.

That is to say, on the basis of associating information shown in FIG. 33 as associating information for phrases, the feature-characteristic computation unit 181 computes feature characteristics like ones shown in FIG. 34 in accordance with Eq. (14).

FIG. 34 is a diagram showing a typical feature characteristic of each phrase (or each label $w_i$).

In a typical table shown in FIG. 34, the first column shows phrases whereas the second column shows feature characteristics.

As shown in FIG. 34, as results of computation, the feature-characteristic computation unit 181 produces a feature characteristic value of 0.708 for the phrase of "hitasura" on the second row, a feature characteristic value of 0.859 for the phrase of "akarui" on the third row, a feature characteristic value of 0.816 for the phrase of "norinori" on the fourth row and a feature characteristic value of 0.699 for the phrase of "kyoku" on the fifth row.

Let us refer back to the flowchart shown in FIG. 32. At a step S92, the characteristic-phrase selection unit 182 selects characteristic phrases from the phrases cut out from the textual information.

For example, the characteristic-phrase selection unit 182 selects the characteristic phrases of "akarui" and "norinori" each having a feature characteristic value greater than 0.8 from the phrases of "hitasura", "akarui", "norinori", "kyoku" and so on like the ones shown in FIG. 34.

In other words, the operation carried out by the characteristic-phrase selection unit 182 to select the characteristic phrases of "akarui" and "norinori" each having a more disproportionate probability distribution parameter (used as associating information) can also be said to be an operation to select phrases each having a close relation with the data of the musical content. That is to say, in the case of the typical feature characteristic values shown in FIG. 34, if the phrases are arranged in an order of increasing feature characteristic values, the phrase of "kyoku" having a feature characteristic value of 0.699 is followed sequentially by the phrase of "hitasura" having a feature characteristic value of 0.708, the phrase of "norinori" having a feature characteristic value of 0.816 and the phrase of "akarui" having a feature characteristic value of 0.859. In this case, for example, the phrases of "akarui" and "norinori" each having a probability distribution parameter (used as associating information) more disproportionate than those of the other phrases are phrases each having a large feature characteristic value in comparison with the other phrases.

In the embodiment described above, the characteristic-phrase selection unit 182 selects phrases each having a feature characteristic value greater than 0.8 as characteristic phrases. It is to be noted however, methods to select a characteristic phrase is by no means limited to the technique described above. For example, phrases each having a feature characteristic value greater than a threshold value determined in advance can each be selected as a characteristic phrase or, as an alternative, the top N % of the phrases are selected among phrases received arranged in an order of decreasing feature characteristic values where N is a number satisfying relations of $0 \leq N \leq 100$.

Let us refer back to the flowchart shown in FIG. 32. At a step S93, the phrase display control unit 183 displays some of the phrases cut out from the textual information as phrases matching the selected characteristic phrases on the display unit 184 as highlighted display items. Then, the processing to display phrases is finally ended.

For example, the phrase display control unit 183 displays some of the phrases cut out from the textual information such as a text reviewing a musical content as phrases matching the selected characteristic phrases of "akarui" and "norinori" selected by the characteristic-phrase selection unit 182 on the display unit 184 as highlighted display items.

FIG. 35 is a diagram showing typical displays each output by the display unit 184 as a display of sentences such as a sentence reviewing a musical content.

As shown in the upper part of FIG. 35, a display output by the display unit 184 shows a sentence of " . . . hitasura akarui norinori no kyoku ga . . . " The sentence includes the characteristic phrases of "akarui" and "norinori" each having a large feature characteristic value. The characteristic phrases are each displayed as a phrase with characters each having a size larger than the size of characters used in other phrases.

As shown in the lower part of FIG. 35, a display output by the display unit 184 shows a sentence of " . . . hitasura akarui norinori no kyoku ga . . . " The sentence includes the characteristic phrases of "akarui" and "norinori" each having a large feature characteristic value. The characteristic phrases are each displayed as a phrase with a background pattern different from the background pattern of other phrases.

In this way, a phrase having a close relation with characteristic quantities of a content is displayed as a highlighted display item. Thus, when the user reads sentences such as a text reviewing the content, the user particularly pays attention to a phrase displayed as a highlighted display item.

In the embodiment described above, a characteristic phrase is displayed as a phrase with characters each having a size larger than the size of characters used in other phrases or displayed as a phrase with a background pattern different from the background pattern of other phrases. It is to be noted, however, that implementations of the present invention are by no means limited to this embodiment. For example, a characteristic phrase can also be displayed as a phrase with a color different from the color of other phrases. The point is that a characteristic phrase can be displayed in any way as long as the way is different from the way to display other phrases.

In addition, in accordance with the present invention, for example, contents and/or labels can also be clustered. For example, the processing to cluster contents (and/or labels) mapped onto a latent space can be carried out by adoption of any clustering algorithm. In this case, since the contents (and/or labels) are typically expressed in the same latent space, the processes to cluster the contents and the labels do not have to be carried out individually by all means. Instead, the contents and the labels can be clustered at the same time to result in clusters in each of which contents are mixed with labels.

Thus, in the content searching processing explained earlier by referring to the flowchart shown in FIG. 16, for example, without searching for a content and a label in separate search processes, a content and a label, which are included in the same cluster, can be regarded as a result of processing to search for the content and the label. As a result, the user is capable of acquiring a desired content quickly.

In addition, in the embodiments described above, the content providing apparatus 1 carries out processing at both the learning and operation phases. However, it is also possible to provide a configuration in which the processing at the learning phase is carried out by an apparatus different from an apparatus for carrying out the processing at the operation phase. By referring to FIGS. 36 and 37, the following description explains configurations of a content providing apparatus 1 for carrying out the processing at the learning phase and another apparatus used for carrying out the processing at the operation phase as an apparatus different from the content providing apparatus 1.

FIG. 36 is a functional block diagram showing a typical functional configuration of a content providing apparatus 1 for carrying out processing at a learning phase.

Configuration elements placed at the same positions in the configuration shown in FIG. 36 as their counterparts shown in FIG. 2 and denoted by the same reference numerals as the counterparts are not explained again in order to avoid duplications of explanation. The configuration of the content providing apparatus 1 shown in FIG. 36 includes the content storage unit 51, the content characteristic quantity extraction unit 52, the content characteristic quantity storage unit 53, the label information extraction unit 54, the label information storage unit 55, the associating information computation unit 56, the content characteristic quantity—latent space associating information storage unit 57 and the label information—latent space associating information storage unit 58, which are units for carrying out the processing at the learning process.

By carrying out the learning process shown in FIG. 3, for example, the content providing apparatus 1 shown in FIG. 36 computes information associating content characteristic quantities of a content stored in the content storage unit 51 with label information of the content, storing the associating information for the content characteristic quantities in the content characteristic quantity—latent space associating information storage unit 57 and the associating information for the label information in the label information—latent space associating information storage unit 58.

That is to say, the content providing apparatus 1 shown in FIG. 36 supplies data stored in itself to an apparatus for carrying out the processing at the operation phase. An example of the apparatus for carrying out the processing at the operation phase is a client terminal apparatus 201 described by referring to FIG. 37 as follows.

FIG. 37 is a functional block diagram showing a typical functional configuration of the client terminal apparatus 201 for carrying out processing at an operation phase.

Configuration elements placed at the same positions in the configuration shown in FIG. 37 as their counterparts shown in FIG. 2 and denoted by the same reference numerals as the counterparts are not explained again in order to avoid duplications of explanation. The configuration of the client terminal apparatus 201 shown in FIG. 37 includes the content characteristic quantity extraction unit 52, the content characteristic quantity—latent space conversion unit 59, the label information—latent space conversion unit 60, the latent space divergence computation unit 61, the label selection unit 62, and the content selection unit 63, which are units for carrying out the processing at the learning process. The client terminal apparatus 201 is a typical information processing apparatus according to the present invention.

By carrying out the label assignment processing shown in FIG. 14, the client terminal apparatus 201 assigns labels to a newly added content. The client terminal apparatus 201 carries out the label assignment processing by acquiring data necessary in the label assignment processing typically from the content providing apparatus 1 shown in FIG. 36.

In addition, by carrying out the content search processing shown in FIG. 16, the client terminal apparatus 201 acquires a content stored in the content providing apparatus 1 shown in FIG. 36. The client terminal apparatus 201 carries out the content search processing by acquiring data required in the content search processing typically from the content providing apparatus 1 shown in FIG. 36.

In this way, in accordance with the present invention, the processing at the learning phase is carried out by a learning-phase apparatus different from an operation-phase apparatus for carrying out the processing at the operation phase.

The reader is advised to keep in mind that it is possible to provide a configuration in which the client terminal apparatus 201 carries out only the label assignment processing shown in FIG. 14 or only the content search process shown in FIG. 16 as processing at the operation phase.

In addition, it is also possible to provide a configuration in which the content providing apparatus 1 shown in FIG. 36 carries out the processing explained earlier by referring to FIGS. 27 to 30 as processing at the learning phase whereas the client terminal apparatus 201 shown in FIG. 37 carries out the processing explained earlier by referring to FIGS. 31 to 35 as processing at the operation phase. The processing carried out by the content providing apparatus 1 at the learning phase and the processing carried out by the client terminal apparatus 201 at the operation phase compose the processing explained earlier by referring to FIGS. 27 to 35.

As described above, in accordance with the present invention, a keyword suitable for a content can be assigned to the content.

In addition, in accordance with the present invention, by virtue of a latent space reflecting characteristics of distributions of content characteristic quantities and label information, a label can be assigned even to a content having no label or a label assigned to a content can be used for searching for the content.

On top of that, in accordance with the present invention, by virtue of a latent space integrating a plurality of kinds of information exhibiting distributions different from each other in addition to the content characteristic quantities and the label information, relationship undiscovered by the existing method can now be invented as mutual relationship between such kinds of information. Thus, the present invention can also be applied to, for example, a system for recommending a content to the user. Examples of the information exhibiting different distributions are context information and favorite information, which are dependent on experiences of users.

It is to be noted that, in the embodiments described above, the associating information is information associating contents with labels. Examples of the associating information are the average vector $\mu_k$, the variance—covariance matrix $S_k$, the pre-probability $\alpha_k$ and the conditional probability p $(w_i|z_k)$. The average vector $\mu_k$, the variance—covariance matrix $S_k$, the pre-probability $\alpha_k$ and the conditional probability p $(w_i|z_k)$ can also be said to be parameters (or, strictly speaking, probability-distribution parameters) representing properties of probability distributions of the content characteristic quantities, the label information and the latent variables. That is to say, the associating information computation unit 56 computes these parameters as the associating information.

In addition, in the embodiments described above, the content characteristic quantity extraction unit 52, the label information extraction unit 54, the context information extraction unit 111 and the favorite information extraction unit 151 extract the content characteristic quantities, the label information, the context information and the favorite information respectively. Instead of making use of the content providing apparatus 1 to extract the content characteristic quantities, the label information, the context information and the favorite information, they can also be extracted by an external apparatus other than the content providing apparatus 1 or given by the user.

In addition, in the embodiments described above, the number of musical contents is ten in order to make the explanation simple. In actuality, however, it is desirable to handle several thousands of musical contents. Nevertheless, the processing can be carried out in the same way in an application with a larger number of musical contents.

The series of processes described previously can be carried out by hardware and/or execution of software. If the series of processes described above is carried out by execution of software, programs composing the software can be installed into a computer embedded in dedicated hardware, a general-purpose personal computer or the like from typically a recording medium. In this case, the computer or the personal computer serves as the content providing apparatus 1 and/or the client terminal apparatus 201 described before. A general-purpose personal computer is a personal computer, which can be made capable of carrying out a variety of functions by installing a variety of programs into the personal computer.

The recording medium for recording programs to be installed into a computer or a general-purpose personal computer as programs to be executed by the computer or the general-purpose personal computer respectively is the removable recording medium 21 shown in FIG. 1 as a recording medium provided to the user separately from the computer or the general-purpose personal computer to provide the user with the programs. Examples of the removable recording medium 21 also referred to as a package medium include the magnetic disk such as a flexible disk, the optical disk such as a CD-ROM (Compact Disk-Read Only Memory) or a DVD (Digital Versatile Disk), the magneto-optical disk such as an MD (MINI DISC, Registered Trademark) as well as the semi-conductor memory. Instead of installing the programs from the removable recording mediums 21, the programs can also be stored in advance in an embedded recording medium included in the main unit of the computer or the general-purpose personal computer provided to the user. Examples of the embedded recording medium are a hard disk included in the storage section 18 and the ROM 12, which are shown in FIG. 1.

The programs stored in the hard disk as programs to be executed by the computer or the general-purpose personal computer to carry out the series of processes described above can also be programs installed, if necessary, from an external source by downloading the programs from the source to the computer or the general-purpose personal computer by way of the communication unit 19 serving as an interface typically having a router or a modem through utilization of communication media based on a radio and/or wire communication. Examples of the communication media based on a radio or wire communication are a local area network, the Internet and a digital broadcasting satellite.

It is to be noted that, in this specification, steps of the flowchart described above can be carried out not only in a pre-prescribed order along the time axis, but also concurrently or individually.

It is also worth noting that the technical term 'system' used in this specification implies the configuration of a confluence including a plurality of apparatus.

It is also to be noted that implementations of the present invention are by no means limited to the embodiments described above. That is to say, it is possible to make a variety of changes to the embodiments as long as the changes are within a range not deviating from essentials of the present invention.

The invention claimed is:

1. An information processing apparatus comprising:
 a first computation unit for receiving information relating to a content item, the information including a characteristic quantity of the content item and attribute information of the content item, wherein the first computation unit:
  (a) determines a property of a first probability distribution for a first latent variable based on the characteristic quantity and the attribute information of the content item;
  (b) determines a property of a second probability distribution for said characteristic quantity;
  (c) determines a property of a third probability distribution for said attribute information; and
  (d) calculates a first parameter using the property of the first probability distribution, the property of the second probability distribution, and the property of the third probability distribution; and
 a storage unit for storing said first parameter.

2. The information processing apparatus according to claim 1 further including:
 a first extraction unit for extracting said characteristic quantity; and
 a second extraction unit for extracting said attribute information,
 wherein said first computation unit computes said first parameter from said extracted characteristic quantity and said extracted attribute information.

3. The information processing apparatus according to claim 2 wherein said second extraction unit splits a sentence written in a natural language into words or phrases each composed of said words.

4. The information processing apparatus according to claim 3, further comprising:
 a second computation unit for computing a feature characteristic showing the degree of relationship between said phrase and said characteristic quantity on the basis of said first parameter computed by said first computation unit; and
 a display control unit for controlling a process to display said phrase on the basis of said extracted feature characteristic.

5. The information processing apparatus according to claim 1 wherein:
 said first computation unit:
  (a) determines a property of a probability distribution for a second latent variable based on the characteristic quantity, the attribute information, and utilization information of the user of the content item;
  (b) determines the property of a probability distribution for said characteristic quantity;
  (c) determines the property of a probability distribution for said attribute information;
  (d) determines the property of a probability distribution for said utilization information; and
  (e) calculates a second parameter using the property of the probability distribution for said second latent variable, the property of the probability distribution for said characteristic quantity, the property of the probability distribution for said attribute information, and the property of the probability distribution for said utilization information; and
 said storage unit is used for storing said second parameter computed by said first computation unit.

6. The information processing apparatus according to claim 5, further including
 an extraction unit for extracting said utilization information, wherein
 said first computation unit computes said second parameter from said characteristic quantity, said attribute information or said utilization information extracted by said extraction unit.

7. The information processing apparatus according to claim 1, wherein:
 said first computation unit:
  (a) determines a property of a probability distribution for a third latent variable based on the characteristic quantity, the attribute information, and said favorite information from the user of the content item;
  (b) determines a property of a probability distribution for said characteristic quantity;
  (c) determines the property of a probability distribution for said attribute information;
  (d) determines the property of a probability distribution for said favorite information used as information on contents each serving as a favorite with a user; and
  (e) calculates a third parameter using the property of the probability distribution for said third latent variable, the property of the probability distribution for said characteristic quantity, the property of the probability distribution for said attribute information; and the property of the probability distribution for said favorite information; and
 said storage unit is used for storing said computed third parameter.

8. The information processing apparatus according to claim 7, further including
 an extraction unit for extracting said favorite information, wherein
 said first computation unit computes said third parameter from said characteristic quantity, said attribute information or said extracted favorite information.

9. An information processing method comprising:
 determining a property of a first probability distribution for a first latent variable based on a characteristic quantity related to a content item, and attribute information of the content item;
 determining a property of a second probability distribution for said characteristic quantity;
 determining a property of a third probability distribution for said attribute information;

calculating a parameter using the property of the first probability distribution, the property of the second probability distribution, and the property of the third probability distribution; and storing said computed parameter.

10. A computer readable storage medium storing a computer program that, when executed by a computer, causes the computer to perform a method, the method comprising:

determining a property of a first probability distribution for a first latent variable based on a characteristic quantity related to a content item, and attribute information of the content item;

determining a property of a second probability distribution for said characteristic quantity;

determining a property of a third probability distribution for said attribute information;

calculating a parameter using the property of the first probability distribution, the property of the second probability distribution, and the property of the third probability distribution; and storing said computed parameter.

* * * * *